(12) United States Patent
Ogawa et al.

(10) Patent No.: US 8,840,747 B2
(45) Date of Patent: Sep. 23, 2014

(54) METHOD FOR MANUFACTURING TWIST BALL TYPE ELECTRONIC PAPER

(75) Inventors: Kenichi Ogawa, Tokyo-to (JP); Hironori Kobayashi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 44 days.

(21) Appl. No.: 13/511,863

(22) PCT Filed: Nov. 18, 2010

(86) PCT No.: PCT/JP2010/070587
§ 371 (c)(1),
(2), (4) Date: May 24, 2012

(87) PCT Pub. No.: WO2011/065281
PCT Pub. Date: Jun. 3, 2011

(65) Prior Publication Data
US 2012/0267044 A1   Oct. 25, 2012

(30) Foreign Application Priority Data
Nov. 25, 2009   (JP) .................................. 2009-268052

(51) Int. Cl.
| B29C 65/52 | (2006.01) |
| B32B 37/12 | (2006.01) |
| B32B 38/10 | (2006.01) |
| B32B 38/14 | (2006.01) |
| B32B 43/00 | (2006.01) |
| G02B 26/02 | (2006.01) |

(52) U.S. Cl.
CPC ..................................... *G02B 26/026* (2013.01)
USPC ............................. 156/249; 156/277; 156/701

(58) Field of Classification Search
USPC .................. 156/247, 249, 250, 259, 277, 701
See application file for complete search history.

(56) References Cited

U.S. PATENT DOCUMENTS

| 6,222,513 B1 | 4/2001 | Howard et al. |
| 6,462,859 B1 | 10/2002 | Bastiaens et al. |
| 6,521,145 B1 * | 2/2003 | Engler et al. ................... 264/1.9 |
| 7,327,346 B2 * | 2/2008 | Chung et al. ................... 345/107 |
| 2001/0048416 A1 | 12/2001 | Miyamoto et al. |
| 2002/0131151 A1 * | 9/2002 | Engler et al. ................... 359/296 |
| 2003/0133207 A1 * | 7/2003 | Minami et al. ................ 359/885 |
| 2003/0214475 A1 * | 11/2003 | Izumi et al. ...................... 345/87 |

FOREIGN PATENT DOCUMENTS

| EP | 596418 A2 * | 5/1994 | ................ C09J 7/02 |
| JP | 11-316397 A | 11/1999 | |
| JP | 2001-100225 A | 4/2001 | |
| JP | 2004-197083 A | 7/2004 | |
| JP | 2006-047614 A | 2/2006 | |
| JP | 2007-206365 A | 2/2006 | |

OTHER PUBLICATIONS

English Abstract of EP 0596418 (Jan. 14, 2014).*
International Search Report: mailed Jan. 11, 2011; PCT/JP2010/070587.
USPTO FOA dated May 1, 2014 in connection with U.S. Appl. No. 13/511,510.
USPTO NFOA dated Dec. 6, 2013 in connection with U.S. Appl. No. 13/511,510.

* cited by examiner

*Primary Examiner* — Sing P Chan
(74) *Attorney, Agent, or Firm* — Ladas & Parry LLP

(57) ABSTRACT

A method for manufacturing a twist ball type electronic paper capable of preferably displaying an image and enabling easily taking out of a wiring, and a manufacturing method for a twist ball type electronic paper for manufacturing a reusable twist ball type electronic paper.

3 Claims, 8 Drawing Sheets

METHOD FOR MANUFACTURING TWIST BALL TYPE ELECTRONIC PAPER

TECHNICAL FIELD

The present invention relates to a manufacturing method for a twist ball type electronic paper capable of carrying out favorable image display using as the display medium an easily reusable twist ball.

Background Art

Recently, an information medium called an electronic paper attracts attention. The information medium having the excellent characteristics such as a low electric power consumption property, a bendable flexibility, thinness and a light weight, and in addition, the outstanding characteristic of rewritability is now put into a practical stage. Specifically, its product is being used for interior advertisements in a train, a display part of a clock, an electronic book, and the like.

There are some kinds of configurations for the information medium. Among them is for example a configuration using a two color phase spherical particle (twist ball) (for example, Patent Literature 1 and Patent Literature 2).

Among the above-described electronic papers using a twist ball, as an electronic paper used for an application of displaying a limited image or pattern such as a poster and an interior advertisement in a train (hereafter it may be referred to as a segment application), the following configuration has conventionally been proposed. FIG. 7 is a schematic cross-sectional view showing an example of such an electronic paper. As shown in FIG. 7, the electronic paper 100 comprises a common electrode side base material 101 having a first base material 101a and a common electrode 101b formed on the first base material 101a, a twist ball layer 102 including a twist ball 103 and a low polarity solvent disposed on the first base material 101a on the opposite side with respect to the common electrode 101b side of the common electrode side base material 101, and a display electrode side base material 111 having a second base material 111a and a display electrode 111b formed in a pattern on the second base material disposed on the twist ball layer 102. Moreover, the display electrode side base material 111 is disposed with the display electrode 111b facing the twist ball layer 102 side with the electronic paper end part sealed with a sealing agent 105.

In the electronic paper 100 shown in FIG. 7, at the time of taking out a wiring 300 from the display electrode 111b, it is necessary to take out the wiring 300 with a through hole provided in the second base material 111a coinciding with the formation position of the display electrode 111b so that a problem arises in that the more minute the pattern of the display electrode 111b is, the more difficult positioning of the display electrode 111b and the through hole of the second base material 111a becomes. Moreover, a step of completely closing the through hole is necessary for sealing the low polarity solvent without liquid leakage, and thus the process is complicated. Furthermore, since the display electrode 111b and the twist ball layer 102 are contacted directly, a problem is involved in that the image display of the electronic paper may be deteriorated due to elusion of the display electrode material into the low polarity solvent of the twist ball layer 102.

Then, an electronic paper of a configuration shown in FIGS. 8 and 9 is proposed.

The electronic paper 100 shown in FIG. 8 has a configuration with a display electrode 111b formed on a fixed substrate 200 for disposing the same on a second base material 111a via a sealing agent 105, a bonding agent 106, and the like. Moreover, an electronic paper 100 shown in FIG. 9 has a configuration with a twist ball layer 102 including a low polarity solvent and a twist ball 103 sealed with a first film base material 101a and a second film base material 111a so that a display electrode 111b formed on a fixed substrate 200 is disposed via a bonding agent 106. Since the numerals not explained in FIGS. 8 and 9 are same as those in FIG. 7, they are not mentioned herein.

According to the above-mentioned configuration, since the twist ball layer 102 including the low polarity solvent and the twist ball 103 is sealed completely with the first base material 101a and the second base material 111a, a step of completely closing the through hole used for connection of the display electrode 111b and the wiring 300 as shown in FIG. 7 is not required. Moreover, since the twist ball layer 102 and the display electrode 111b are not contacted directly according to the above-mentioned configuration, elution of the display electrode material into the low polarity solvent of the twist ball layer 102 can be prevented.

However, according to the electronic papers shown in FIGS. 8 and 9, as in the case of the electronic paper 100 shown in FIG. 7, at the time of taking out the wiring 300 from the display electrode 111b, the wiring 300 needs to be taken out by providing a through hole in the fixed substrate 200 coinciding with the formation position of the display electrode 111b, so that a problem arises in that positioning of the display electrode 111b and the through hole of the fixed substrate 200 becomes difficult with a more minute display electrode 111b pattern. Furthermore, in the case the second base material 111a is a flexible film base material, at the time of disposing the display electrode 111b formed on the fixed substrate 200 and the second base material 111a via the bonding agent 106, a problem is involved in that yield of attaching the fixed substrate 200 and the second base material 111a is lowered by the ruggedness of the display electrode 111b and the image display of the electronic paper is deteriorated.

Moreover, since the above-described electronic paper needs a high production cost, reuse thereof is desired.

On the other hand, although it is not shown in drawings, also in a passive drive type electronic paper, a configuration comprising a transparent electrode side base material having a counter electrode formed like a stripe on a fixed substrate, a first base material and a transparent electrode formed on the first base material, a twist ball layer including a twist ball and a low polarity solvent disposed on the first base material on the opposite side with respect to the transparent electrode side of the above-mentioned transparent electrode side base material, and a display member having a second base material disposed on the above-mentioned twist ball layer with the counter electrode and the second base material disposed via a bonding agent, and the like has been proposed. Also in this configuration, a problem is involved in that yield of attaching the fixed substrate and the second base material is lowered by the ruggedness of the counter electrode and the image display of the electronic paper is deteriorated.

CITATION LIST

Patent Literature

Patent Literature 1: Japanese Patent Application Publication Laid-Open (JP-A) No. 2006-047614
Patent Literature 2: JP-A No. 2007-206365

SUMMARY OF INVENTION

Technical Problem

A main object of the present invention is to provide a manufacturing method for a twist ball type electronic paper for manufacturing a twist ball type electronic paper capable of preferably displaying an image and enabling easily taking out of a wiring. Moreover, another main object of the present invention is to provide a manufacturing method for a twist ball type electronic paper for manufacturing a reusable twist ball type electronic paper.

Solution to Problem

In order to achieve the above-mentioned objects, the present invention provides a manufacturing method for a twist ball type electronic paper comprising steps of: a transparent electrode side base material preparing step of preparing a transparent electrode side base material by forming a transparent electrode on one side surface of a first base material comprising a film having transparency; a counter electrode side base material preparing step of preparing a counter electrode side base material by forming in a pattern a counter electrode using a forming method capable of patterning the counter electrode on one side surface of a second base material including a film with an insulation property; a twist ball layer forming step of forming a twist ball layer out of a twist ball and a low polarity solvent layer including a low polarity solvent; and a twist ball layer sealing step of sealing the above-mentioned twist ball layer with the above-mentioned first base material and second base material by disposing the above-mentioned transparent electrode side base material and the above-mentioned counter electrode side base material in such a way that the above-mentioned twist ball layer is sandwiched between the above-mentioned transparent electrode side base material and the above-mentioned counter electrode side base material, and disposing the above-mentioned counter electrode side base material with the above-mentioned counter electrode disposed on an opposite side with respect to the above-mentioned twist ball layer.

According to the present invention, since a configuration with the above-mentioned counter electrode and the above-mentioned twist ball layer not contacted directly can be provided, image display deterioration derived from elution of the counter electrode material into the low polarity solvent can be prevented so that a twist ball type electronic paper with the excellent display quality can be produced. Moreover, yield decline at the time of attaching due to ruggedness of the counter electrode or deterioration of the image display of the electronic paper to be produced can be prevented.

Furthermore, in the case the twist ball type electronic paper to be manufactured by the present invention is an electronic paper used for the segment application (hereafter, it may be referred to as an electronic paper for a segment), since the above-mentioned counter electrode side base material is disposed with the counter electrode disposed on the opposite side with respect to the twist ball layer in the twist ball layer sealing step, an electronic paper for a segment enabling easy taking out of the wiring from the counter electrode can be manufactured.

Moreover, in the present invention, it is preferable to seal the above-mentioned twist ball layer by a lamination process of the above-mentioned first base material and the above-mentioned second base material by using a material enabling the lamination process for the first base material and the second base material in the twist ball layer sealing step. Since the twist ball layer is sealed by the lamination process of the first base material and the second base material, compared with the case of for example sealing the twist ball layer using a sealing agent, the display area of the twist ball type electronic paper to be produced by the manufacturing method of the present invention can be provided in a wider range. Moreover, since it is a sealing method of a twist ball layer without disposing the sealing agent on the outer periphery of the twist ball layer, in the case of arranging and tiling plural display panels, influence of the joint between the panels to the display can be alleviated. This is because the thermally fused portion of the both film base materials by the lamination process can be disposed on the side surface or the rear surface of the display surface utilizing the plasticity of the film.

Moreover, the present invention provides a manufacturing method for a twist ball type electronic paper comprising steps of: a transparent electrode side base material preparing step of preparing a transparent electrode side base material by forming a transparent electrode on one side surface of a first base material comprising a film having transparency; a counter electrode side base material preparing step of preparing a counter electrode side base material by forming in a pattern a counter electrode using a forming method capable of patterning the counter electrode on one side surface of a second base material including a film with an insulation property; a twist ball layer forming step of forming a twist ball layer out of a twist ball and a low polarity solvent layer including a low polarity solvent, a twist ball member forming step of forming a twist ball member by sealing the above-mentioned twist ball layer with a film-like supporting base material with an insulation property and the above-mentioned first base material; and a counter electrode side base material disposing step of disposing the above-mentioned counter electrode side base material on an outer side of the supporting base material of the above-mentioned twist ball member in such a way that the above-mentioned counter electrode is on an opposite side with respect to the above-mentioned twist ball member.

According to the present invention, a twist ball type electronic paper comprising the twist ball member having the above-mentioned transparent electrode side base material, twist ball layer and supporting base material, and the counter electrode side base material provided independently can be produced. Thereby, in the case of changing the image display displayed by the twist ball type electronic paper, since the above-mentioned twist ball member can be used repeatedly while producing only the above-mentioned counter electrode side base material with the design of the counter electrode changed according to the change of the above-mentioned image display, reuse of the twist ball type electronic paper can be facilitated.

Moreover, since a configuration with the above-mentioned counter electrode and the above-mentioned twist ball layer not contacted directly can be provided, image display deterioration derived from elution of the counter electrode material into the low polarity solvent can be prevented so that a twist ball type electronic paper with the excellent display quality can be produced. Moreover, yield decline at the time of attaching due to ruggedness of the counter electrode or deterioration of the image display of the electronic paper to be produced can be prevented.

Furthermore, in the case the twist ball type electronic paper to be manufactured by the present invention is an electronic paper for a segment, since the above-mentioned counter electrode side base material disposing step is provided, an electronic paper for a segment enabling easy taking out of the wiring from the above-mentioned counter electrode can be manufactured.

In the present invention, in the above-mentioned counter electrode side base material disposing step, it is preferable that the above-mentioned counter electrode side base material is disposed on a surface on the opposite side with respect to the above-mentioned twist ball member of the supporting base material via a re-detachable adhesive. Since the re-detachable adhesive is used, the counter electrode side base material can easily be replaced.

Moreover, in the present invention, in the above-mentioned twist ball member forming step, it is preferable to seal the above-mentioned twist ball layer by a lamination process of the above-mentioned first base material and the above-mentioned supporting base material by using a material enabling the lamination process for the first base material and the supporting base material. Since the above-mentioned twist ball layer is sealed by the lamination process of the first base material and the supporting base material, compared with the case of for example sealing the above-mentioned twist ball layer using a sealing agent, the display area of the twist ball type electronic paper to be produced by the manufacturing method of the present invention can be provided in a wider range. Moreover, since it is a sealing method of a twist ball layer without disposing the sealing agent on the outer periphery of the twist ball layer, in the case of arranging and tiling plural display panels, influence of the joint between the panels to the display can be alleviated. This is because the thermally fused portion of the both film base materials by the lamination process can be disposed on the side surface or the rear surface of the display surface utilizing the plasticity of the film.

The present invention provides a manufacturing method for a twist ball type electronic paper comprising steps of: a transparent electrode side base material preparing step of preparing a transparent electrode side base material by forming a transparent electrode on one side surface of a first base material comprising a film having transparency; a counter electrode side base material preparing step of preparing a counter electrode side base material by forming in a pattern a counter electrode using a forming method capable of patterning the counter electrode on one side surface of a second base material including a film with an insulation property; a twist ball layer forming step of forming a twist ball layer out of a twist ball and a low polarity solvent layer including a low polarity solvent; a twist ball member forming step of forming a twist ball member by sealing the above-mentioned twist ball layer with a film-like first supporting base material having transparency and with an insulation property and a film-like second supporting base material with an insulation property; a transparent electrode side base material disposing step of disposing the above-mentioned transparent electrode side base material on an outer side of the first supporting base material of the above-mentioned twist ball member; and a counter electrode side base material disposing step of disposing the above-mentioned counter electrode side base material on an outer side of the second supporting base material of the above-mentioned twist ball member in such a way that the above-mentioned counter electrode is on an opposite side with respect to the above-mentioned twist ball member.

According to the present invention, a twist ball type electronic paper comprising the twist ball member having the above-mentioned first supporting base material, twist ball layer and second supporting base material, and the counter electrode side base material provided independently can be produced. Thereby, in the case of changing the image display displayed by the twist ball type electronic paper, since the above-mentioned twist ball member can be used repeatedly while producing only the above-mentioned counter electrode side base material with the design of the counter electrode changed according to the change of the above-mentioned image display, reuse of the twist ball type electronic paper can be facilitated.

Moreover, since a configuration with the above-mentioned counter electrode and the above-mentioned twist ball layer not contacted directly can be provided, image display deterioration derived from elution of the counter electrode material into the low polarity solvent can be prevented so that a twist ball type electronic paper with the excellent display quality can be produced. Moreover, yield decline at the time of attaching due to ruggedness of the counter electrode or deterioration of the image display of the electronic paper to be produced can be prevented.

Furthermore, in the case the twist ball type electronic paper to be manufactured by the present invention is an electronic paper for a segment, since the above-mentioned counter electrode side base material disposing step is provided, an electronic paper for a segment enabling easy taking out of the wiring from the above-mentioned counter electrode can be manufactured.

Moreover, according to the present invention, a twist ball type electronic paper can be manufactured easily by attaching the members after independently forming the above-mentioned transparent electrode side base material, twist ball member and counter electrode side base member.

In the above-mentioned twist ball member forming step, it is preferable to seal the above-mentioned twist ball layer by a lamination process of the above-mentioned first supporting base material and the above-mentioned second supporting base material by using a material enabling the lamination process for the first supporting base material and the second supporting base material. Since the twist ball layer is sealed by the lamination process of the first supporting base material and the second supporting base material, compared with the case of for example sealing the above-mentioned twist ball layer using a sealing agent, the display area of the twist ball type electronic paper to be produced by the manufacturing method of the present invention can be provided in a wider range. Moreover, since it is a sealing method of a twist ball layer without disposing the sealing agent on the outer periphery of the twist ball layer, in the case of arranging and tiling plural display panels, influence of the joint between the panels to the display can be alleviated. This is because the thermally fused portion of the both film base materials by the lamination process can be disposed on the side surface or the rear surface of the display surface utilizing the plasticity of the film.

In the present invention, it is preferable that the above-mentioned counter electrode is formed using a cutting machine in the above-mentioned counter electrode side base material preparing step. Since a cutting machine is used, a metal foil, and the like can be cut into a predetermined shape according to a desired image display for forming a counter electrode by attaching the same onto the second base material, a counter electrode side base material can easily be prepared. Moreover, as compared with methods such as a printing method and a deposition process, since a printing original block, a metal mask, and the like are not required at the time of forming the above-mentioned counter electrode, the counter electrode in an electronic paper used as an information medium of a small quantity and a wide variety can be formed at a low cost.

Moreover, in the present invention, it is preferable that the above-mentioned counter electrode is formed by a pattern application method in the above-mentioned counter electrode side base material preparing step. Since the above-mentioned counter electrode is formed by the pattern application method, even a counter electrode having a highly sophisticated pattern can easily be formed.

Moreover, in the above-mentioned invention, it is preferable that the above-mentioned pattern application method is an ink jet process. Since the ink jet process is used, a counter electrode having a highly sophisticated pattern can be formed efficiently. Moreover, as compared with methods such as a printing method and a deposition process, since a printing original block, a metal mask, and the like are not required at the time of forming the above-mentioned counter electrode, the counter electrode in an electronic paper used as an information medium of a small quantity and a wide variety can be formed at a low cost.

Moreover, the present invention provides a manufacturing method for a reproduced twist ball type electronic paper comprising steps of: preparing a twist ball type electronic paper before replacement comprising: a twist ball member further comprising a transparent electrode side base material having a first base material made of a film having transparency and a transparent electrode formed on one side surface of the above-mentioned first base material; a film-like supporting base material with an insulation property, and a twist ball layer having a twist ball and a low polarity solvent layer including a low polarity solvent, so that the above-mentioned twist ball layer is sealed with the above-mentioned first base material and the above-mentioned supporting base material; a counter electrode side base material before replacement further comprising a second base material with an insulation property, and a counter electrode formed on one side surface of the above-mentioned second base material, so that the above-mentioned counter electrode side base material before replacement is disposed on an outer side of the above-mentioned supporting base material of the above-mentioned twist ball member in such a way that the above-mentioned counter electrode is on an opposite side with respect to the above-mentioned twist ball member; detaching the above-mentioned counter electrode side base material before replacement from the above-mentioned twist ball member; and disposing and mounting another new counter electrode side base material on the outer side of the above-mentioned supporting base material of the above-mentioned twist ball member after detachment of the above-mentioned counter electrode side base material before replacement in such a way that the counter electrode of the above-mentioned new counter electrode side base material is on the opposite side with respect to the above-mentioned twist ball member.

According to the present invention, only by detaching the counter electrode side base material before replacement of the above-mentioned twist ball type electronic paper before replacement from the above-mentioned twist ball member, and disposing and mounting another new counter electrode side base material on the outer side of the supporting base material of the above-mentioned twist ball member after detachment of the counter electrode side base material before replacement in such a way that the counter electrode of the new counter electrode side base material is on the opposite side with respect to the twist ball member, a reproduced twist ball type electronic paper capable of carrying out a different image display can be formed with the display quality equivalent to that of the twist ball type electronic paper before replacement. Thereby, since the above-mentioned twist ball member can be used repeatedly, a reproduced twist ball type electronic paper can be manufactured at a low cost.

Advantageous Effects of Invention

In the present invention, since a configuration with the above-mentioned counter electrode and the above-mentioned twist ball layer not contacted directly can be provided, image display deterioration derived from elution of the counter electrode material into the low polarity solvent can be prevented so that a twist ball type electronic paper with the excellent display quality can be produced. Moreover, yield decline at the time of attaching due to ruggedness of the counter electrode or deterioration of the image display of the electronic paper to be produced can be prevented.

Moreover, in the case the twist ball type electronic paper to be manufactured by the present invention is an electronic paper for a segment, since the above-mentioned counter electrode side base material disposing step is provided, an electronic paper for a segment enabling easy taking out of the wiring from the above-mentioned counter electrode can be manufactured. Furthermore, since the above-mentioned twist ball member and the above-mentioned counter electrode side base material can be formed independently in the present invention, in the case of changing the image display of the twist ball type electronic paper, the above-mentioned twist ball member can be used repeatedly while forming only a counter electrode side base material according to change of the design so that a twist ball type electronic paper facilitating reuse can be manufactured.

DESCRIPTION OF EMBODIMENTS

Figure 1A:
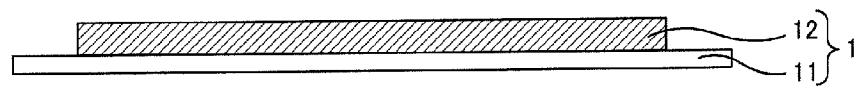
FIGS. 1A to 1E are a process diagram showing an example of a manufacturing method for a twist ball type electronic paper of the present invention.
Figure 1B:
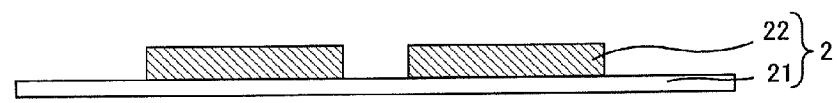
Figure 1C:
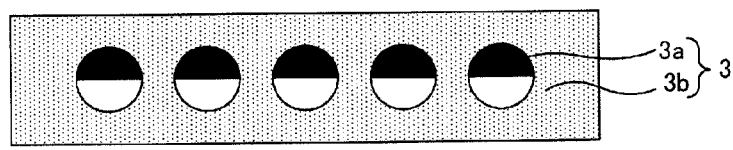

Hereafter, a manufacturing method for a twist ball type electronic paper, and a manufacturing method for a reproduced twist ball type electronic paper of the present invention will be explained.

A. Manufacturing Method for a Twist Ball Type Electronic Paper

First, a manufacturing method for a twist ball type electronic paper (hereafter, it may be referred to simply as an electronic paper) of the present invention will be explained.

As it will be described later in detail, the manufacturing method for an electronic paper of the present invention enables the configuration of the electronic paper to be produced as a configuration of having the above-mentioned counter electrode not indirect contact with the above-mentioned twist ball layer. The above-mentioned configuration of an electronic paper solves the problems such as decline of yield of attaching by the ruggedness of the counter electrode and deterioration of the image display of the electronic paper, and deterioration of the image display due to direct contact of the counter electrode and the twist ball layer which have conventionally been problematic in an electronic paper for a segment and a passive driving type electronic paper; and complication at the time of taking out the wiring from the counter electrode, which has been problematic in an electronic paper for a segment, and the like. Therefore, the manufacturing method for an electronic paper of the present invention can be used preferably particularly at the time of producing an electronic paper for a segment or a passive driving type electronic paper. Moreover, by using a counter electrode forming method using of such as a cutting machine and an ink jet, which does not require a printing original block, a metal mask, and the like at the time of forming a counter electrode, the counter electrode in an electronic paper used as an information medium of a small quantity and a wide variety can be formed at a low cost. Moreover, as it will be explained in detail in "2. Manufacturing method for an electronic paper of a second embodiment" and "Manufacturing method for an electronic paper of a third embodiment", in the present invention, since the above-mentioned twist ball member having the twist ball layer and the supporting base material, and the counter electrode side base material are formed independently, by disposing the above-mentioned counter electrode side base material on the above-mentioned supporting base material via a re-detachable adhesive, the above-mentioned counter electrode side base material can be replaced easily so that a reusable twist ball type electronic paper can be produced.

Moreover, as it will be described later in detail, in the case an electronic paper to be produced by the present invention is an electronic paper for a segment, the transparent electrode side base material and the transparent electrode are used as a common electrode side base material and a common electrode, and the counter electrode side base material and the counter electrode are used as a display electrode side base material and a display electrode. Moreover, in the case an electronic paper to be produced by the present invention is a passive driving type electronic paper, one of the transparent electrode and the counter electrode is used as a scanning (row) electrode and the other as a signal (column) electrode.

The manufacturing method of en electronic paper of the present invention can be classified roughly into 3 embodiments according to the position of disposing the counter electrode side base material in an electronic paper to be produced. Hereafter, the manufacturing method for an electronic paper of each embodiment will be explained.

1. Manufacturing Method for an Electronic Paper of a First Embodiment

The manufacturing method for an electronic paper of the present embodiment comprises steps of: a transparent electrode side base material preparing step of preparing a transparent electrode side base material by forming a transparent electrode on one side surface of a first base material including a film having transparency; a counter electrode side base material preparing step of preparing a counter electrode side base material by forming in a pattern a counter electrode using a forming method capable of patterning the counter electrode on one side surface of a second base material including a film with an insulation property; a twist ball layer forming step of forming a twist ball layer out of a twist ball and a low polarity solvent layer including a low polarity solvent; and a twist ball layer sealing step of sealing the above-mentioned twist ball layer with the above-mentioned first base material and second base material by disposing the above-mentioned transparent electrode side base material and the above-mentioned counter electrode side base material in such a way that the twist ball layer is sandwiched between the transparent electrode side base material and the counter electrode side base material, and disposing the counter electrode side base material with the counter electrode disposed on an opposite side with respect to the twist ball layer.

The manufacturing method for an electronic paper of the present embodiment will be explained with reference to the drawings. FIGS. 1A to 1E are a process diagram showing an example of a manufacturing method for an electronic paper of the present embodiment.

Figure 1D:
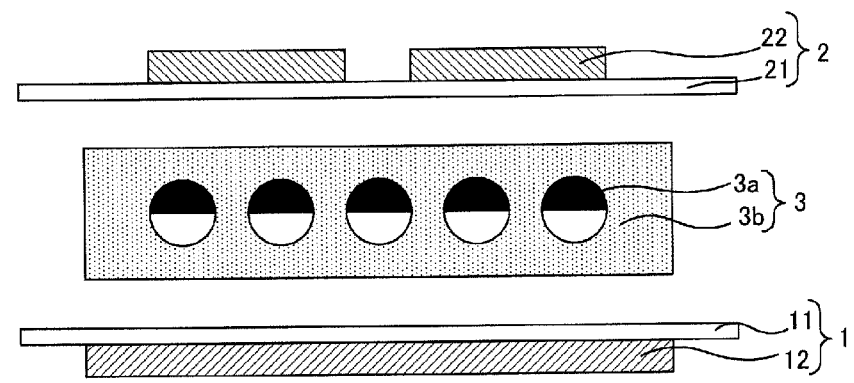

As shown in FIGS. 1A to 1E, the manufacturing method for an electronic paper of the present embodiment comprises steps of: a transparent electrode side base material preparing step (FIG. 1A) of preparing a transparent electrode side base material 1 by forming a transparent electrode 12 on one side surface of a first base material 11 comprising a film having transparency; a counter electrode side base material preparing step (FIG. 1B) of preparing a counter electrode side base material 2 by forming in a pattern a counter electrode 22 using a forming method capable of patterning a counter electrode on one side surface of a second base material 21 comprising a film with an insulation property; a twist ball layer forming step (FIG. 10) of forming a twist ball layer 3 out of a twist ball 3a and a low polarity solvent layer 3b including a low polarity solvent; and a twist ball layer sealing step (FIG. 1E) of sealing the above-mentioned twist ball layer 3 with the first base material 11 and the second base material 21 by disposing the transparent electrode side base material 1 and the counter electrode side base material 2 in such a way that the twist ball layer 3 is sandwiched between the transparent electrode side base material 1 and the counter electrode side base material 2, and disposing the counter electrode side base material 2 with the counter electrode 22 disposed on the opposite side with respect to the twist ball layer 3 (FIG. 1D).

Figure 1E:
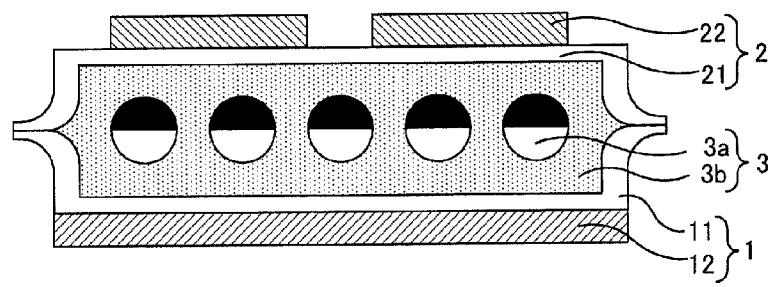

Moreover, FIGS. 1A to 1E show an example of sealing the twist ball layer 3 by a lamination process of the first base material 11 and the second base material 21 in the twist ball layer sealing step (FIG. 1E). Although it is not shown in drawings, the above-mentioned twist ball layer may be sealed by disposing a sealing agent between the first base material and the second base material in the above-mentioned twist ball layer sealing step.

Figure 2A:
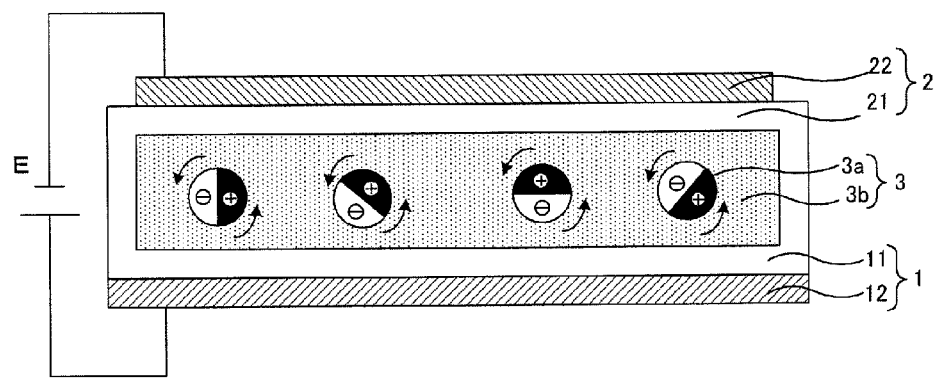
FIGS. 2A and 2B are each a schematic cross-sectional view showing an example of a twist ball type electronic paper.
Figure 2B:
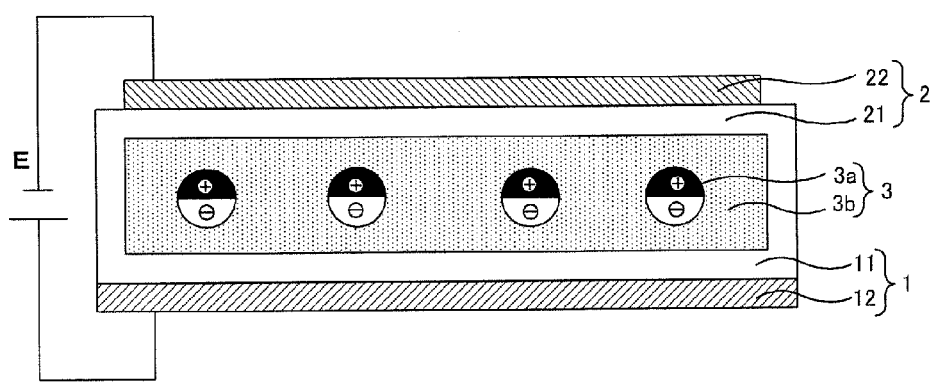

Here, the method of image display using an electronic paper using a twist ball will be explained with reference to an example. FIGS. 2A and 2B are each a schematic cross-sectional view showing an example of an electronic paper. In FIGS. 2A and 2B, the twist ball 3a has a black phase portion charged with a positive charge, and a white phase portion charged with a negative charge so as to form a permanent dipole. Moreover, the first base material 11 has an insulation property. As shown in FIGS. 2A and 2B, by applying a predetermined electric field E between the transparent electrode 12 and the counter electrode 22, the twist ball 3a interposed between the transparent electrode 12 and the counter electrode 22 is in an electric field. As described above, since the twist ball 3a has the black phase charged with a positive charge and the white phase charged with a negative charge, in the above-mentioned application state, each twist ball 3a (FIG. 2A) has the black phase of the twist ball 3a oriented to the second base material 21 side and the white phase of the twist ball 3a oriented to the first base material 11 side (FIG. 2B).

Moreover, although it is not shown in drawings, if an electric field of the opposite direction with respect to the above-described electric field is applied between the transparent electrode 12 and the counter electrode 22, the black phase of the twist ball is oriented to the first base material side, and the white phase of the twist ball is oriented to the second base material side.

In such an electronic paper using a twist ball, image display can be carried out by controlling the orientation of the twist ball.

FIGS. 2A and 2B show that the twist ball layer 3 is sealed by a lamination process of the first base material 11 and the second base material 21 in a simplified manner. Moreover, since the numerals not explained in FIGS. 2A and 2B are same as those of FIGS. 1A to 1E, they are not mentioned here.

Figure 7:
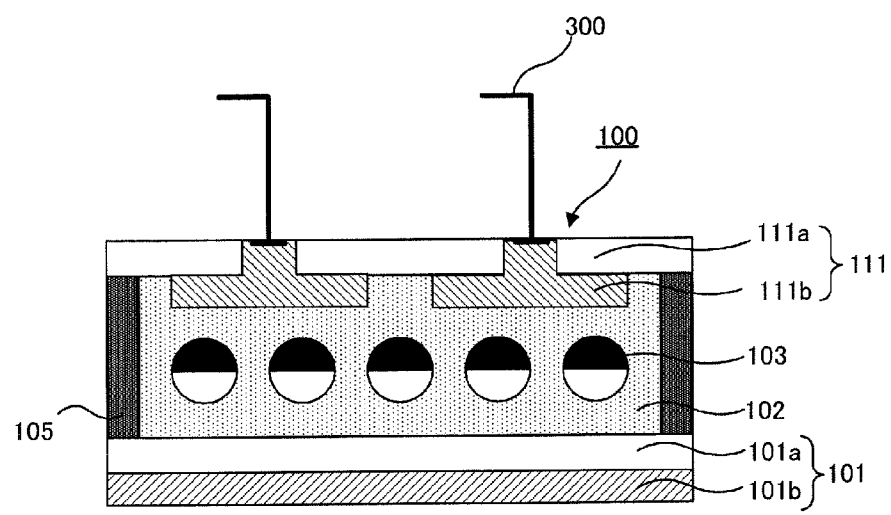
FIG. 7 is a schematic cross-sectional view showing an example of a twist ball type electronic paper.

As described above, since the twist ball has a charge, for example as shown in FIG. 7, in the case the electronic paper has a configuration with the twist ball layer 102 and the display electrode 111*b* contacted directly, the display electrode material having a conductivity eluted into the low polarity solvent of the twist ball layer 102 would influence the twist ball 103 so that a problem is involved in that the display quality of the electronic paper may be lowered. Moreover, at the time of taking out the wiring 300 from the display electrode 111*b*, the wiring 300 should be taken out by providing a through hole in the second base material 111*a* according to the formation position of the display electrode 111*b* so that a problem arises in that positioning of the display electrode 111*b* and the through hole of the second base material 111*a* becomes difficult with a finer display electrode 111*b* pattern. Furthermore, a step of completely closing the through hole is required for sealing the low polarity solvent without liquid leakage so that the step is complicated.

FIG. 7 shows an example of an electronic paper for a segment. Although it is not shown in drawings, also in a passive driving type electronic paper, in the case of a configuration with the counter electrode and the twist ball layer contacted directly, a problem is involved in that the display quality of the electronic paper may be deteriorated.

According to the present embodiment, since the above-mentioned twist ball layer sealing step is provided, an electronic paper of a configuration with the above-mentioned twist ball layer and the above-mentioned counter electrode not contacted directly can be produced. Thereby, a high quality electronic paper capable of restraining image display deterioration of the electronic paper by the elution of the counter electrode material into the low polarity solvent of the twist ball layer can be produced.

Figure 8:
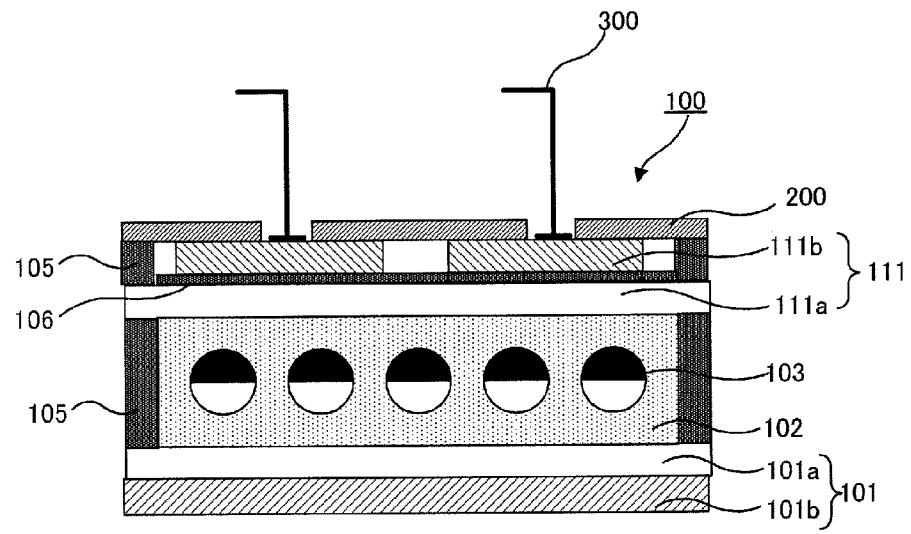
FIG. 8 is a schematic cross-sectional view showing another example of a twist ball type electronic paper.
Figure 9:
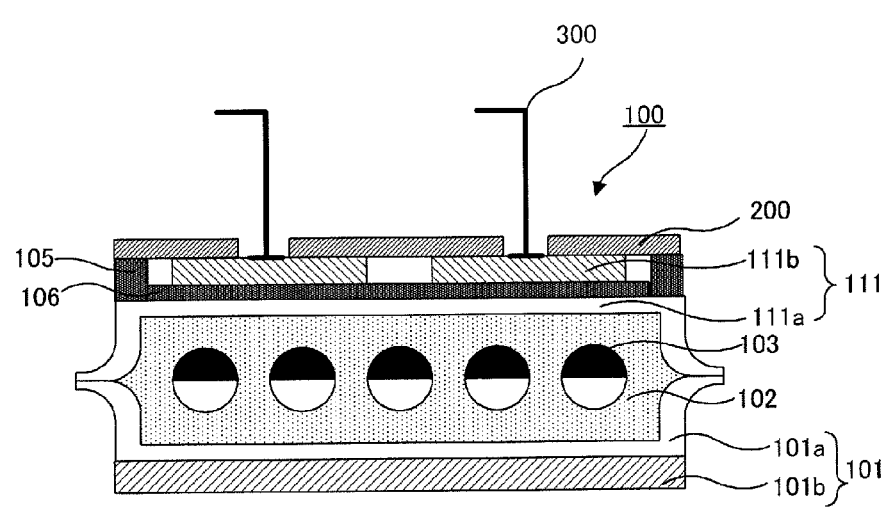
FIG. 9 is a schematic cross-sectional view showing yet another example of a twist ball type electronic paper.

Moreover, as to the configuration with the twist ball layer and the display electrode not contacted directly, as it is shown in FIGS. 8 and 9, a configuration of forming a display electrode 111*b* on a fixed substrate 200 for disposing the same onto a second base material 111*a* has also been considered. Also in this case as in FIG. 7, since positioning of the fixed substrate 200 and the display electrode 111*b* is required for providing the through hole in the fixed substrate 200 for taking out the wiring 300 from the display electrode 111*b*, a problem is involved in that the production step of the electronic paper is complicated. Furthermore, in the case the second base material 111*a* is a plastic film base material, at the time of disposing the display electrode 111*b* formed on the fixed substrate 200 and the second base material 111*a* via the bonding agent 106, a problem arises in that yield in attaching the fixed substrate 200 and the second base material 111*a* may be lowered due to ruggedness of the display electrode 111*b* and the image display of the electronic paper may be deteriorated. FIGS. 8 and 9 show an example of an electronic paper for a segment. Although it is not shown in drawings, also in the case of a passive driving type electronic paper, yield decline of the electronic paper due to ruggedness of the display electrode and image display deterioration of the electronic paper are problematic.

On the other hand, according to the present embodiment, since the above-mentioned counter electrode is disposed on the opposite side with respect to the above-mentioned twist ball layer, yield decline at the time of attaching due to ruggedness of the counter electrode and image display deterioration of the electronic paper can be prevented. Moreover, in the case the electronic paper to be produced by the present embodiment is an electronic paper for a segment, since the counter electrode side base material has the counter electrode disposed on the opposite side with respect to the twist ball layer in the twist ball layer sealing step, an electronic paper for a segment capable of easily taking out the wiring from the counter electrode can be manufactured.

Hereafter, each step in the manufacturing method for an electronic paper of the present embodiment will be explained.

(1) Transparent Electrode Side Base Material Preparing Step

First, the transparent electrode side base material preparing step will be explained.

This step is a step for preparing a transparent electrode side base material by forming a transparent electrode on one side surface of a first base material comprising a film having transparency.

In the present embodiment, in the case the electronic paper to be manufactured by the present embodiment is an electronic paper for a segment, the transparent electrode side base material prepared by this step is used as a common electrode side base material.

Hereafter, the first base material used in this step, the transparent electrode formed by this step, and the method for forming the transparent electrode will be explained, respectively.

(a) First Base Material

The first base material used in this step comprises a film having transparency and has the transparent electrode to be described later formed on one side surface of the first base material. Moreover, this is for sealing the twist ball layer together with the second base material used for the counter electrode side base material in the twist ball layer sealing step to be described later.

The first base material used in this step is not particularly limited as long as it is a film having transparency and enabling the transparent electrode to be described later formed on the surface of the first base material so that it may or may not have an insulation property; however, it is preferable that it has an insulation property. Since the first base material has an insulation property, image display can be carried out preferably by the twist ball in the twist ball layer in the electronic paper to be manufactured by the manufacturing method for an electronic paper of the present embodiment.

Moreover, the material for the above-mentioned first base material is not particularly limited as long as it is a transparent plastic material. Specifically, examples thereof include polypropylene, polyethylene, polyvinyl chloride, polystyrene, polyvinyl alcohol, polyimide, polyethylene naphthalate, polyethylene terephthalate, polycarbonate, polyether imide, an epoxy resin, a silicone resin and a phenol resin.

Moreover, in the manufacturing method for an electronic paper of the present embodiment, since the twist ball layer is sealed preferably by a lamination process of the first base material and the second base material in the twist ball layer sealing step to be described later, it is more preferable to use as the first base material a base material with a base film material enabling lamination process and the sealant film material to be described later laminated.

Among the above-described first base material, as examples of a base film material enabling lamination process, from the viewpoint of the heat resistance by heat pressing at the time of the lamination process, polyimide, polyethylene naphthalate, polyethylene terephthalate, polycarbonate, polyether imide, an epoxy resin, a silicone resin, and a phenol resin can be presented.

Moreover, examples of the sealant film material include non-drawn polypropylene film and two-axis drawn polypropylene film. Moreover, a coating film of a material with a heat sealable property such as polyurethane, polyacrylic, an epoxy resin and silicone can also be used.

Here, at the time of the lamination process, naturally, the above-mentioned first base material and second base material are bonded with the sealant film material side faced out of the laminated base film material and sealant film material.

Moreover, in the case of the lamination process using the above-mentioned second base material and first base material with the base film material enabling the lamination process and the sealant film material laminated, it is further preferable that the materials of the above-mentioned second base material and first base material are the same base film material and sealant film material. Since the materials of the above-mentioned second base material and first base material are the same base film material and sealant film material, adhesion of the second base material and the first base material can be improved at the time of the lamination process.

The film thickness of such a first base material is not particularly limited as long as it has a self supporting property to the extent that the transparent electrode to be described later can be formed. The film thickness of such a first base material is in a range of 10 μm to 300 μm, it is more preferably in a range of 15 μm to 100 μm, and it is particularly preferably in a range of 25 μm to 50 μm. In the case the film thickness of the first base material is less than the above-mentioned range, the transparent electrode to be described later can hardly be formed on the first base material surface. In the case the film thickness of the first base material is more than the above-mentioned range, due to the thickness of the first base material, image display cannot be carried out so that the flexibility of the electronic paper to be manufactured by the manufacturing method of the present embodiment may be lowered.

(b) Transparent Electrode

Then, the transparent electrode used in this step will be explained. The transparent electrode used in this step is formed on the above-mentioned first base material. Here, in the case the electronic paper to be manufactured by the present embodiment is an electronic paper for a segment, the above-mentioned transparent electrode is used as a common electrode. In the case the electronic paper to be manufactured by the present embodiment is a passive driving type electronic paper, one of the above-mentioned transparent electrode and the counter electrode to be described later is used as a scanning (row) electrode and the other as a signal (column) electrode.

Here, the transparency of the above-mentioned transparent electrode is not particularly limited as long as image display can be observed in the electronic paper produced by the present embodiment. For not lowering the display quality, transparency of 80% or more of total light transmittance by the measurement based on the JIS K7361-1:1997 is preferable.

The transparent electrode used in this step is not particularly limited as long as it is formed on the first base material. For example, the transparent electrode may be formed directly on the first base material, or for example the transparent electrode may be formed on a film having transparency so that the film having transparency and with the above-mentioned transparent electrode formed is disposed on the first base material.

The above-described transparent electrode is not particularly limited as long as it is an electrode having the above-described transparency. Examples thereof include an electrode formed as a thin film using a transparent conductor such as ITO, $SnO_2$, and ZnO:Al, and an electrode formed like a mesh using a conductive material.

Moreover, in the case an electrode formed like a mesh is used as the transparent electrode, only the electrode formed like a mesh may be used alone, or it may be used together with the above-mentioned thin film-like electrode including the transparent conductor.

The material used for the electrode formed like a mesh is not particularly limited as long as it has conductivity. Examples thereof include a paste and a colloid solution prepared by blending a metal material such as Al, Cu and Ag, or a material such as Ag, Cu, carbon in a solvent or a synthetic resin binder.

Moreover, as the above-mentioned electrode formed like a mesh, those having a line width in a range of 2 μm to 30 μm and a mesh pitch in a range of 250 μm to 500 μm can be used preferably.

In this step, in the case the transparent electrode is a common electrode, in general, the transparent electrode is formed on the above-described first base material entire surface.

On the other hand, in the case the transparent electrode is an electrode used for a passive driving type electronic paper, it is formed so as to have a pattern corresponding to the pattern of the above-described counter electrode. Since the pattern of the transparent electrode may be same as the pattern of the transparent electrode used for a common passive driving type display device, it is not mentioned here.

The film thickness of the transparent electrode formed in this step is not particularly limited as long as it is a film thickness capable of functioning as an electrode and being formed on the first base material by an even film thickness. The film thickness of the transparent electrode is preferably in a range of 50 nm to 10 μm, more preferably in a range of 100 nm to 5 μm, and particularly preferably in a range of 200 nm to 1 μm. In the case the transparent electrode film thickness is less than the above-mentioned range, the transparent electrode can hardly be formed by an even film thickness on the first base material surface. Moreover, in the case the film thickness of the above-mentioned transparent electrode is more than the above-mentioned range, due to increase of the time and the material used for film formation of the transparent electrode, the production cost is made higher.

(c) Transparent Electrode Forming Method

As the method for forming the transparent electrode used in this step, in the case of forming the above-mentioned transparent electrode directly on the first base material, a method of forming a thin film on the first base material using the above-described transparent conductor by methods such as a sputtering process, a vacuum deposition process, a CVD process, and an application method can be presented.

Moreover, in the case of forming the above-mentioned transparent electrode on a film having transparency and disposing the film having transparency and with the transparent electrode formed onto the first base material, following methods can be presented as examples: a method of forming the transparent electrode onto the film having transparency and attaching the same onto the first base material using an adhesive, and the like in the same method as in the case of directly forming the transparent electrode on the first base material; and a method of applying lamination process to the film having transparency and with the transparent electrode formed and the first base material. The film having transparency is not particularly limited as long as it has the above-mentioned transparency. Specifically, the same materials as the above-described first base material can be used. Moreover, since the transparent adhesive, and the like may be same as those used for attaching common resin base materials, and thus it is not mentioned here.

Moreover, the above-mentioned electrode formed like a mesh can be formed by a method such as patterning, screen printing, and gravure printing of etching the conductive film formed on the base material. The base material for forming the mesh-like electrode may either be the above-mentioned first base material or the above-mentioned film having transparency.

(2) Counter Electrode Side Base Material Preparing Step

Next, the counter electrode side base material preparing step will be explained.

This step is a step for preparing the counter electrode side base material by forming the counter electrode in a pattern using a formation method capable of patterning the counter electrode on one side surface of the second base material comprising a film with an insulation property.

In the case the electronic paper to be produced by the present embodiment is an electronic paper for a segment, the counter electrode side base material is used as a display electrode side base material.

Hereafter, the second base material used in this step, the counter electrode to be formed in this step, and the manufacturing method for the counter electrode will be explained, respectively.

(a) Second Base Material

The second base material used in this step comprises a film having an insulation property with the above-mentioned counter electrode formed on one side surface of the second base material. Moreover, it is for sealing the twist ball layer to be described later together with the first base material used for the above-described transparent electrode side base material.

The second base material used in this step is not particularly limited as long as it has a self supporting property to the extent that the counter electrode is formed on the second base material. Moreover, the second base material may or may not be transparent, but those having a transparency are preferable. The electronic paper manufactured by the manufacturing method for an electronic paper of the present embodiment has image display observed from the transparent electrode side. Therefore, in the case of observing the electronic paper from the transparent electrode side, since the second base material is disposed on the lower layer side of the twist ball layer for carrying out the image display, in the case the second base material is transparent, problems such as light leakage may be generated.

Moreover, in this step, as needed, the second base material may be colored to the color of one of the twist balls used for the image display.

The material for such a second base material is not particularly limited as long as it is a common plastic material. Since the same materials as the above-described first base material can be used, it is not mentioned here. Moreover, in this step, it is more preferable to use a material enabling lamination process. Since those including a material enabling lamination process are used for the above-described first base material and second base material, in the twist ball layer sealing step to be described later, the twist ball layer to be described later can be sealed by the lamination process of the first base material and the second base material. Since the material enabling the lamination process may be same as the materials used for the above-described first base material, it is not mentioned here.

Moreover, the film thickness of the above-mentioned second base material is not particularly limited as long as it is a film thickness enabling formation of the above-mentioned counter electrode. It is in a range of 10 µm to 300 µm, it is more preferably in a range of 15 µm to 100 µm, and it is particularly preferably in a range of 25 µm to 50 µm. In the case the film thickness of the above-mentioned second base material is less than the above-mentioned range, the above-mentioned counter electrode can hardly be formed on the second base material. In the case the film thickness of the second base material is more than the above-mentioned range, at the time of carrying out display using the electronic paper to be manufactured by the manufacturing method of the present embodiment, due to the thickness of the second base material, the image display may not be executed using the twist ball. Moreover, the flexibility of the electronic paper to be manufactured by the manufacturing method of the present embodiment may be lowered due to the thickness of the second base material.

(b) Counter Electrode

Hereafter, the counter electrode to be formed by this step will be explained.

Here, in the case the electronic paper to be manufactured by the present embodiment is an electronic paper for a segment, the above-mentioned counter electrode is used as a display electrode. Moreover, in the case the electronic paper to be manufactured by the present embodiment is a passive driving type electronic paper, one of the above-mentioned counter electrode and the above-described transparent electrode is used as a scanning (row) electrode and the other as a signal (column) electrode.

The counter electrode is not particularly limited as long as it is made of a material with a conductivity so that image display is enabled using the twist ball layer to be described later by applying a voltage to the counter electrode. As such a counter electrode, the counter electrode may be formed directly on the second base material, it may be formed between the second base material and the counter electrode via an adhesive layer, and the like, or it may be formed by forming the counter electrode on a film other than the second base material, and disposing the film with the counter electrode formed on the second base material. In this step, for simplifying the step, it is more preferable that the counter electrode is formed directly on the second base material.

Moreover, the shape of the counter electrode to be formed by this step is not particularly limited as long as it has a shape according to the design to be displayed in the case the electronic paper to be manufactured by the present embodiment is an electronic paper for a segment. As a specific design, for example, characters and patterns can be presented.

Moreover, in the case the electronic paper to be manufactured by the present embodiment is a passive driving type electronic paper, the counter electrode generally has a pattern corresponding to the pattern of the above-described transparent electrode. Since the pattern of the counter electrode may be same as the pattern of the counter electrode used for a common passive driving type display device, it is not mentioned here.

The material used for the counter electrode is not particularly limited as long as it has conductivity. Examples thereof include a product prepared by blending a metal such as Au, Al, Ag, Ni, and Cu, a transparent conductor such as ITO, $SnO_2$, and ZnO:Al, or a conductive agent in a solvent or a synthetic resin binder. As the above-mentioned conductive agent, cationic polymer electrolytes such as polymethyl benzyl trimethyl chloride, and polyallyl polymethyl ammonium chloride; anionic polymer electrolytes such as polystyrenesulfonate, and polyacrylate; and electron conductive zinc oxide, tin oxide, indium oxide, carbon fine powders, and Ag fine powders can be used.

Moreover, as the material used for the counter electrode, in particular, in consideration of the conductivity and formation on the film base material, a flexible conductive material capable of enduring the stretch of the base material, such as a conductive paste prepared by blending a metal such as Au, Cu, Al, and Ag, carbon, and Ag fine powders in a synthetic resin binder is preferable.

The film thickness of the counter electrode to be formed in this step is not particularly limited as long as it is formed on the above-described second base material by an even film thickness. Specifically, it is preferably in a range of 50 nm to 500 µm, more preferably in a range of 100 nm to 100 µm, and particularly preferably in a range of 300 nm to 50 µm. In the case the counter electrode film thickness is less than the above-mentioned range, the counter electrode can hardly be formed by an even film thickness on the above-described second base material. In the case the film thickness of the counter electrode is more than the above-mentioned range, due to increase of the time and the material used for formation of the counter electrode, the production cost is made higher.

(c) Counter Electrode Forming Method

The counter electrode forming method used in this step is not particularly limited as long as a forming method enabling patterning for providing a predetermined pattern to the counter electrode according to the application of the electronic paper to be manufactured.

As the formation method enabling patterning, following methods can be presented: a deposition method in a pattern on the second base material using the above-mentioned metal and transparent conductor with a metal mask, and the like, by methods such as a sputtering process, a vacuum deposition process, and a CVD process; a pattern application method of blending the above-mentioned metal, transparent conductor, or the above-mentioned conductive agent with a solvent or a synthetic resin binder for applying the same on the second base material in a pattern; a method of cutting the above-mentioned metal thin film, or a film with a thin film of a metal, a transparent conductor, and the above-mentioned conductive agent formed into a predetermined shape with a cutting machine, and attaching the same on the second base material using an adhesive; a method of forming a thin film made of the above-mentioned counter electrode material on the entire surface of the second base material, patterning a resist on the coating film and etching; and a method of attaching a metal foil with a bonding agent formed onto the second base material in a pattern. As the formation method for the above-mentioned counter electrode, as to the deposition process, the pattern application method, the etching method, and the like, it may be formed directly on the second base material, or a counter electrode may be formed on a film other than the second base material and disposing the above-mentioned film with the counter electrode formed on the second base material.

In this step, in particular, a method of forming the counter electrode by a pattern application method is preferable. Thereby, a counter electrode having a highly sophisticated pattern can easily be formed.

As such a pattern application method, for example, printing methods such as an ink jet process, a printing method, a screen printing method, a gravure printing method, and a relief printing method can be presented. As the pattern application method used in the present embodiment, it is particularly preferable to use an ink jet process. According to the counter electrode formation method using an ink jet process, since a counter electrode patterning can be carried out according to a desired image display without the need of a metal mask used for a sputtering process, a vacuum deposition method, a CVD process, and the like, or a printing original block used for a printing method, and the like, a counter electrode used for an electronic paper as an information medium of a small quantity and a wide variety can be formed at a low cost.

In the case of using the above-mentioned pattern application method as the counter electrode forming method, as needed, a step of drying the counter electrode applied on the second base material can be carried out.

Moreover, in this step, it is also preferable to form a counter electrode using a cutting machine. Since the counter electrode can be formed by cutting a metal foil in a predetermined shape according to a desired image display by use of the cutting machine, a counter electrode used for an electronic paper as an information medium of a small quantity and a wide variety can be formed at a low cost.

(3) Twist Ball Layer Forming Step

Next, the twist ball layer forming step will be explained.

This step is a step for forming a twist ball layer comprising a twist ball and a low polarity solvent layer including a low polarity solvent.

Hereafter, the twist ball, the low polarity solvent layer and the twist ball layer forming method used in this step will be explained, respectively.

(a) Twist Ball

The twist ball used in this step functions as a display medium in an electronic paper manufactured by a manufacturing method of the present embodiment.

The twist ball used in this step is not particularly limited as long as it is spherical and it has two different color phases of a colored phase/a white phase or a colored phase/a colored phase so that the different two color phases have different dipoles, respectively.

Such a twist ball may be same as the twist ball produced by a micro channel production method proposed in the official gazette of Patent Application Publication Laid Open No. 2004-197083.

Here, the micro channel production method is a production method for a twist ball as a two color phase spherical polymer particle and a dipolar spherical particle having a (±) polarity in terms of the charge by using a colored continuous layer and a spherical particle phase with a relationship of an O/W type or a W/O type for successively ejecting the two color colored continuous phases into the spherical particle phase of a flowable medium flowing from the first micro channel for transferring the colored continuous phase to the second micro channel.

In the above-mentioned micro channel production method, in a oil-based or water-based flowable medium containing a polymerizable resin component, a polymerizable resin component in a colored continuous phase with the phase separated into two colors containing a colored dye pigment insoluble to the medium is formed with a polymerizable monomer charged positively and negatively, which are different with each other, for being transferred to a first micro channel, and then the colored continuous phase is ejected successively into a water-based or oil-based spherical particle phase flowing in a second micro channel continuously or intermittently. Then, since the ejected product ejected into the spherical particle phase is formed spherical successively into the spherical particle phase while being ejected, dispersed and transferred in series in the micro channel, a twist ball is prepared appropriately by polymerization hardening of the polymerizable resin component in the spherical particle by UV irradiation and/or heating.

As the above-mentioned colored continuous phase, a continuous color phase separated into two color phases, such as separated color phases of two colors selected from any "colored phase/white phase" including for example the group consisting of black/white, red/white, yellow/white, blue/white, green/white, and purple/white, and separated color phases of different two colors of colored phase/colored phase can be presented. The coloring agent for forming such a color phase is not particularly limited as long as it is insoluble to or dispersed in the flowable dispersion medium containing the polymerizable resin component to be described later so that it may be selected and used appropriately. As the above-mentioned coloring agent, a dye and a pigment can be used.

As such a dye and a pigment, since those mentioned in the official gazette of Patent Application Publication Laid Open No. 2004-197083 can be used, it is not mentioned here.

The addition amount of the dye and pigment as the coloring agent is not particularly limited. Moreover, since the desired color tone differs depending on factors such as the application of the colored particle and furthermore, and in terms of the dispersion property, and the like in the above-described colored continuous phase, in the present embodiment, it may be added appropriately and preferably in a range of 0.1 part by weight to 80 parts by weight, and preferably in a range of 2 parts by weight to 10 parts by weight with respect to 100 parts by weight of the total polymerizable resin component as the polymerizable hardening component in the colored continuous phase.

As the polymerizable resin component (or the polymerizable monomer) used in the above-mentioned twist ball, depending on the kind of the functional group or the substituent of the polymerizable monomer used for the twist ball, the monomer species with the charge property of the above-mentioned twist ball each with the tendency of showing a (−) charge property and a (+) charge property can be presented. Therefore, in the case of using as the polymerizable resin component of the present embodiment at least two or more kinds of monomers, while knowing well the tendency of showing the (+) and (−) charge properties thereof, combining monomers with the tendency of the same kind of charge property may be used optionally and preferably.

On the other hand, in the polymerizable resin component (or polymerizable monomer) having in a molecule at least one kind of a functional group and/or a substituent, as the functional group or the substituent, for example, carbonyl group, vinyl group, phenyl group, amino group, amide group, imide group, hydroxyl group, halogen group, sulfonic acid group, epoxy group, and urethane bond can be presented. In the present embodiment, monomer species having a functional group or a substituent in such a polymerizable monomer may be used alone or as a combination of two or more kinds appropriately and preferably.

As the polymerizable monomer of the tendency of the (−) charge property and the polymerizable monomer of the tendency of the (+) charge property, since those mentioned in the official gazette of Patent Application Publication Laid Open No. 2004-197083 can be used, it is not mentioned here.

In the twist ball used in this step, in the case such a polymerizable monomer is used in combination with another co-polymerizable monomer at the time of polymerization of the polymerizable resin component after ejection as a colored continuous phase in the second micro channel already described above, although it depends also on the charge property (or electrophoresis property) desired for the colored resin fine particle, if it is a co-polymerized particle with a polymerizable monomer having the monomer of the charge property tendency in the total monomer based on the weight in a range of 1% to 100%, more preferably in a range of 5% to 100%, and particularly preferably in a range of 10% to 100%, it may be used appropriately and preferably for providing a desired twist ball.

Moreover, the above-mentioned twist ball may be prepared appropriately as a spherical single dispersion particle with the average particle size based on the volume in a range of 1.0 μm to 400 μm, preferably in a range of 20 μm to 200 μm and further preferably in a range of 50 μm to 120 μm. Moreover, a uniform particle with an extremely low irregularity of its average particle size can be prepared appropriately. In the present embodiment, with the uniform ratio thereof represented by the Cv value, a twist ball of a single dispersion particle of 20% or less, preferably of 5% or less, and further preferably of 3% or less can be used appropriately and preferably.

(b) Low Polarity Solvent Layer

The low polarity solvent layer used in this step is not particularly limited as long as it includes a low polarity solvent. The low polarity solvent layer in general includes a low polarity solvent, and an elastomer sheet made of an elastomer material for swelling the low polarity solvent.

Hereafter, the low polarity solvent and the elastomer sheet used for the low polarity solvent layer will be explained, respectively.

(i) Low Polarity Solvent

The low polarity solvent used in this step is used for smooth rotation of the above-described twist ball. Moreover, it is used in general while being swelled in the elastomer sheet to be described later.

The low polarity solvent is not particularly limited as long as it enables smooth rotation of the above-mentioned twist ball without hindering rotation thereof. As examples of such a low polarity solvent, dimethyl silicone oil, isoparaffin-based solvent, straight chain paraffin-based solvent, dodecane, and tridecane can be presented.

(ii) Elastomer Sheet

The elastomer sheet used in this step is made of an elastomer material capable of swelling the above-mentioned low polarity solvent. Moreover, the above-mentioned elastomer sheet is a sheet-like member with the above-mentioned twist ball dispersed to be used while swelling the above-mentioned low polarity solvent thereby.

The material used for the elastomer sheet is not particularly limited as long as it can disperse the above-mentioned twist ball and it can swell the above-mentioned low polarity solvent.

As examples of the material for the elastomer sheet, a silicone resin, an (slightly cross-linked) acrylic resin, a (slightly cross-linked) styrene resin, and a polyolefin resin can be presented.

Moreover, the thickness of the above-mentioned elastomer sheet is not particularly limited as long as the electronic paper to be manufactured by the manufacturing method of the present embodiment can carry out the image display by the twist ball dispersed in the elastomer sheet. It is preferably in a range of 50 μm to 1,000 μm, more preferably in a range of 100 μm to 700 μm, and particularly preferably in a range of 200 μm to 500 μm. In the case the film thickness of the above-mentioned elastomer sheet is less than the above-mentioned range, the elastomer sheet with the above-mentioned twist ball dispersed homogeneously can hardly be provided.

In the case the film thickness of the elastomer sheet is more than the above-mentioned range, twist ball rotation may be hindered.

(c) Twist Ball Layer Forming Method

Then, the method for forming the twist ball layer to be formed in this step will be explained. The method for forming the twist ball layer used in this step is not particularly limited as long as a twist ball layer capable of carrying out the image display at the time of using the same for the electronic paper is formed. For example, a method of swelling the low polarity solvent in an elastomer sheet by homogeneously dispersing the above-mentioned twist ball in the elastomer material, forming the elastomer sheet using the same, and then impregnating the elastomer sheet in the above-mentioned low polarity solvent can be presented.

The film thickness of the twist ball layer to be formed in this step is not particularly limited as long as the image display can be carried out by rotating the twist ball in the electronic paper to be manufactured by the manufacturing method of the present embodiment. It is preferably in a range of 50 μm to 1,000 μm, more preferably in a range of 100 μm to 700 μm, and particularly preferably in a range of 200 μm to 500 μm. In the case the film thickness of the twist ball layer is less than the above-mentioned range, due to the small distance between the twist ball and the base materials, the twist ball may hardly be rotated to a desired direction. In the case the film thickness of the twist ball layer is more than the above-mentioned range, even in the case an electric field is applied between the above-mentioned transparent electrode and counter electrode, due to the too large distance between the twist ball and the base materials, the image display can hardly be executed using the twist ball in the electronic paper to be manufactured by the manufacturing method of the present embodiment.

(4) Twist Ball Layer Sealing Step

Then, the twist ball layer sealing step of the present embodiment will be explained.

This step is a step of sealing the above-mentioned twist ball layer with the above-mentioned first base material and second base material by disposing the above-mentioned transparent electrode side base material and the above-mentioned counter electrode side base material in such a way that the twist ball layer is sandwiched between the transparent electrode side base material and the counter electrode side base material, and disposing the counter electrode side base material with the counter electrode disposed on the opposite side with respect to the twist ball layer.

The arrangement of the transparent electrode side base material in this step is not particularly limited as long as a desired image display can be carried out using the electronic paper to be manufactured by the manufacturing method of the present embodiment. For example, the transparent electrode side base material may be disposed in such a way that the transparent electrode is on the twist ball layer side or the transparent electrode side base material may be disposed in such a way that the transparent electrode is on the opposite side with respect to the twist ball layer. In this step, it is preferable that the transparent electrode side base material is disposed in such a way that the transparent electrode is on the opposite side with respect to the twist ball layer. According to the arrangement, since the transparent electrode is not contacted directly with the twist ball layer, the transparent electrode material is not eluded into the low polarity solvent of the twist ball layer so that display quality decline of the electronic paper to be manufactured by the manufacturing method of the present embodiment can be prevented.

Moreover, in the case a material hardly eluded to the low polarity solvent is used as the material for the transparent electrode, the transparent electrode side base material may be disposed with the transparent electrode disposed on the twist ball layer side to be described later.

In the case the electronic paper to be manufactured by the present embodiment is a passive driving type electronic paper, it is preferable that the transparent electrode side base material is disposed in such a way that the transparent electrode is on the opposite side with respect to the twist ball layer. Since the transparent electrode is formed in a pattern such as a stripe in the passive driving type electronic paper, in the case the transparent electrode is disposed on the twist ball layer side, due to ruggedness of the transparent electrode, the twist ball layer may hardly be sealed with the first base material and the second base material.

Moreover, the twist ball layer sealing method used in this step is not particularly limited as long as the twist ball layer can be sealed with the first base material and second base material. The twist ball layer sealing method may be for example, a method of sealing the twist ball layer by disposing a sealing agent for sealing between the first base material and the second base material, or a method of sealing the twist ball layer by using a material enabling lamination process for the first base material of the transparent electrode side base material and the second base material of the counter electrode side base material, and executing the lamination process of the first base material and the second base material. In the present embodiment, a method of sealing the twist ball layer by the lamination process is more preferable.

The above-mentioned method of sealing the twist ball layer by the lamination process enables a wider range of a display area of the electronic paper compared with the method of using a sealing agent, so that in the case of arranging and tiling plural display panels, influence of the joint between the panels to the display can be alleviated. This is because the thermally fused portion of the both film base materials by the lamination process may be disposed on the side surface or the rear surface of the display surface utilizing the plasticity of the film.

Moreover, in the case the twist ball layer is sealed with a sealing agent, since the transparent electrode side base material and the counter electrode side base material have a flexibility, a problem is involved in that liquid leakage of the low polarity solvent in the twist ball layer may be generated by exfoliation of a part of the sealing agent, and the like.

On the other hand, in the case the twist ball layer is sealed by the lamination process, handling of the twist ball layer laminated with the first base material and the second base material is facilitated.

Since the method for sealing the above-mentioned twist ball layer by the lamination process may be same as a common lamination process, explanation is omitted here.

Moreover, as to the sealing method using a sealing agent, it may be same as a common sealing method of attaching base materials, it is not mentioned here.

(5) Other Steps

The manufacturing method for an electronic paper of the present embodiment is not particularly limited as long as it has the above-described transparent electrode side base material preparing step, counter electrode side base material preparing step, twist ball layer forming step and twist ball layer sealing step, and as needed steps may be added appropriately.

As such a step, for example, a step of mounting a wiring to the counter electrode can be presented. An example of the step of mounting the wiring to the counter electrode includes formation of a coating film of a photo setting resin composition with an insulation property for forming an insulation layer on the entire surface of the counter electrode side of the counter electrode side base material, formation of an opening part for mounting the wiring to the counter electrode in a part of the insulation layer using a photolithography process, and the like, and then mounting the wiring to the counter electrode from the opening part.

2. Manufacturing Method for an Electronic Paper of a Second Embodiment

The method for manufacturing an electronic paper of the present embodiment comprises steps of: a transparent electrode side base material preparing step of preparing a transparent electrode side base material by forming a transparent electrode on one side surface of a first base material including a film having transparency; a counter electrode side base material preparing step of preparing a counter electrode side base material by forming in a pattern a counter electrode using a forming method capable of patterning the counter electrode on one side surface of a second base material comprising a film with an insulation property; a twist ball layer forming step of forming a twist ball layer out of a twist ball and a low polarity solvent layer including a low polarity solvent; a twist ball member forming step of forming a twist ball member by sealing the above-mentioned twist ball layer with a film-like supporting base material with an insulation property and the above-mentioned first base material; and a counter electrode side base material disposing step of disposing the above-mentioned counter electrode side base material on an outer side of the supporting base material of the above-mentioned twist ball member in such a way that the above-mentioned counter electrode is on an opposite side with respect to the above-mentioned twist ball member.

The manufacturing method for an electronic paper of the present embodiment will be explained with reference to the drawings. FIGS. 3A to 3E are a process diagram showing an example of a manufacturing method of an electronic paper of the present embodiment. The manufacturing method for an electronic paper of the present embodiment is a method for manufacturing an electronic paper 10 by comprising steps of: a transparent electrode side base material preparing step (FIG. 3A) of preparing a transparent electrode side base material 1 by forming a transparent electrode 12 on one side surface of a first base material 11 comprising a film having transparency; a counter electrode side base material preparing step (FIG. 3B) of preparing a counter electrode side base material 2 by forming a counter electrode 22 using a forming method capable of patterning a counter electrode on one side surface of a second base material 21 comprising a film with an insulation property; a twist ball layer forming step (FIG. 3C) of forming a twist ball layer 3 out of a twist ball 3a and a low polarity solvent layer 3b including a low polarity solvent; a twist ball member forming step (FIG. 3D) of forming a twist ball member 30 by sealing the above-mentioned twist ball layer 3 with a film-like supporting base material 20 with an insulation property and the first base material 11; and a counter electrode side base material disposing step (FIG. 3E) of disposing the counter electrode side base material 2 on the outer side of the supporting base material 20 of the twist ball member 30 in such a way that the counter electrode 22 is on the opposite side with respect to the twist ball member 30.

Figure 3A:
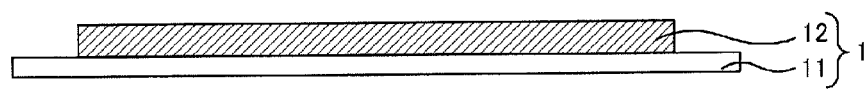
FIGS. 3A to 3E are a process diagram showing another example of a manufacturing method of a twist ball type electronic paper of the present invention.
Figure 3B:
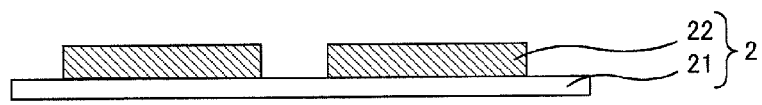
Figure 3C:
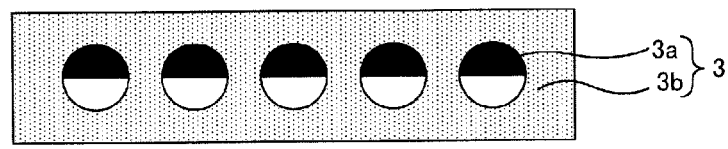
Figure 3D:
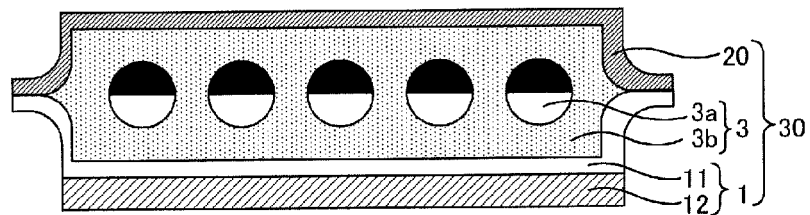

Moreover, FIGS. 3A to 3E show an example of sealing the twist ball layer 3 by a lamination process of the first base material 11 and the supporting base material 20 in the twist ball member forming step (FIG. 3D). Although it is not shown in drawings, the above-mentioned twist ball layer may be sealed by disposing a sealing agent between the first base material and the supporting base material in the above-mentioned twist ball member forming step.

According to the present invention, an electronic paper comprising a twist ball member having the above-mentioned transparent electrode side base material, twist ball layer and supporting base material, and a counter electrode side base material provided independently can be produced. Thereby, in the case of changing the design displayed by the electronic paper, since the above-mentioned twist ball member can be used repeatedly while producing only the above-mentioned counter electrode side base material with the design changed, reuse of the electronic paper can be facilitated.

Moreover, since a configuration with the counter electrode and the twist ball layer not contacted directly can be provided, image display deterioration derived from elution of the counter electrode material into the low polarity solvent can be prevented so that a twist ball type electronic paper with the excellent display quality can be produced. Moreover, yield decline at the time of attaching due to ruggedness of the counter electrode or deterioration of the image display of the electronic paper to be produced can be prevented.

Furthermore, in the case the electronic paper to be manufactured by the present embodiment is an electronic paper for a segment, since the above-mentioned counter electrode side base material disposing step is provided, an electronic paper for a segment enabling easy taking out of the wiring from the above-mentioned counter electrode can be manufactured.

Hereafter, each step in the manufacturing method for an electronic paper of the present embodiment will be explained.

Since the transparent electrode side base material preparing step and the twist ball layer forming step used in the manufacturing method for an electronic paper of the present embodiment are same as the steps explained in "1. Manufacturing method for an electronic paper of a first embodiment", explanation is omitted here.

(1) Counter Electrode Side Base Material Preparing Step

This step is a step of preparing a counter electrode side base material by forming in a pattern a counter electrode using a forming method capable of patterning a counter electrode on one side surface of a second base material comprising a film with an insulation property.

Figure 3E:
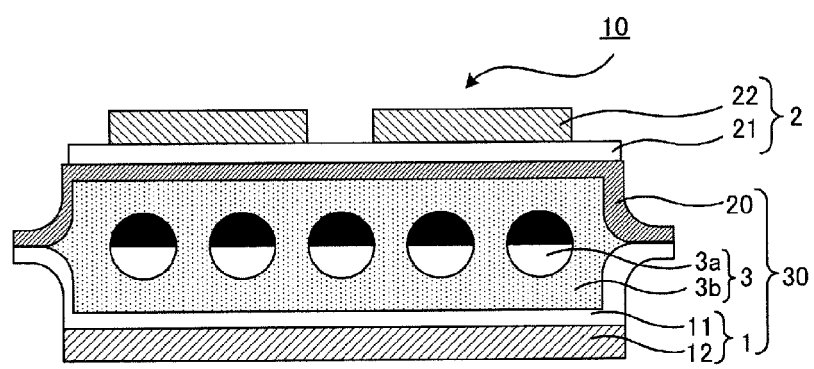
Figure 4:
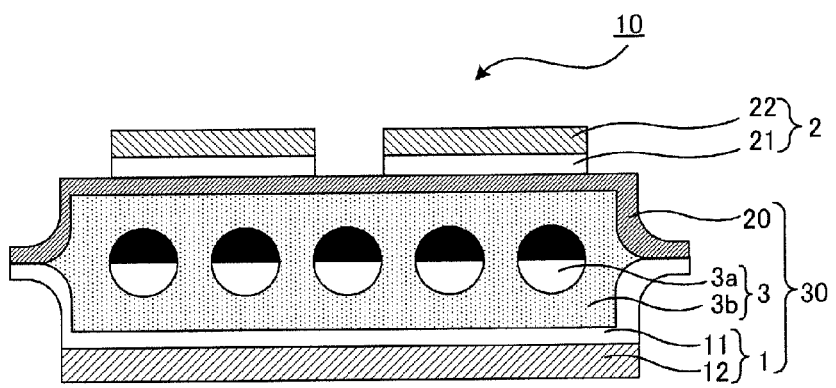
FIG. 4 is a schematic cross-sectional view showing an example of a twist ball type electronic paper manufactured by a manufacturing method for a twist ball type electronic paper of the present invention.

The second base material used in this step is not particularly limited as long as the counter electrode can be formed on the second base material and the counter electrode side base material can be disposed on the outer side of the supporting base material of the above-mentioned display member in such a way that the counter electrode is on the opposite side with respect to the display member. For example, it may be a base material capable of covering the entire surface of the supporting base material 20 as shown in FIG. 3E, or it may be a base material having a pattern according to the counter electrode 22 formed on the second base material 21 as shown in FIG. 4. FIG. 4 is a schematic cross-sectional view showing an example of an electronic paper to be manufactured by the present embodiment. Since the numerals not explained are same as those in FIGS. 3A to 3E, it is not mentioned here.

Since this step may be same as the counter electrode side base material preparing step explained in "1. Manufacturing method for an electronic paper of a first embodiment", explanation is omitted here.

(2) Twist Ball Member Forming Step

This step is a step of forming a twist ball member by sealing the twist ball layer with a film-like supporting base material and the above-mentioned first base material.

Hereafter, the supporting base material, and the method of sealing the twist ball layer used in this step will be explained.

(a) Supporting Base Material

The supporting base material used in this step is a film-like member having an insulation property for sealing the above-mentioned twist ball layer together with the first base material used for the above-mentioned transparent electrode side base material for providing a twist ball member. Moreover, the above-mentioned supporting base material has the above-mentioned counter electrode side base material disposed on the opposite side with respect to the twist ball layer.

Such a supporting base material is not particularly limited as long as it can seal the above-mentioned twist ball layer together with the first base material used for the above-mentioned transparent electrode side base material for providing a twist ball member, and the above-mentioned counter electrode side base material can be disposed on the surface on the opposite side with respect to the twist ball layer of the above-mentioned supporting base material so that it may either be transparent or not transparent.

As the material for the supporting base material, the same materials for the first base material and the second base material mentioned in "1. Electronic paper of a first embodiment" can be appropriately selected and used. Moreover, the material for the supporting base material is preferably a material enabling lamination process. Since the material enabling lamination process is used for the material for the above-mentioned first base material and supporting base material, the twist ball layer can be sealed by the lamination process. Moreover, in the case a material enabling the lamination process is used for the material of the first base material and the supporting base material, it is preferable that the materials for the first base material and the supporting base material are same. Since the materials of the first base material and the supporting base material are same, adhesion at the time of the lamination process of the first base material and the supporting base material can be made higher.

The film thickness of the supporting base material is not particularly limited as long as the twist ball member is provided by sealing the twist ball layer together with the first base material, and the counter electrode side base material can be disposed on the surface on the opposite side with respect to the twist ball layer of the supporting base material. Specifically, it is in a rage of 10 μm to 300 μm, preferably in a range of 15 μm to 100 μm, and more preferably in a range of 25 μm to 50 μmμ. In the case the film thickness of the supporting base material is less than the above-mentioned range, the above-mentioned counter electrode side base material can hardly be disposed on the supporting base material. In the case the film thickness of the supporting base material is more than the above-mentioned range, a preferable image display can hardly be carried out in the electronic paper to be manufactured by the manufacturing method of the present embodiment.

(b) Twist Ball Layer Sealing Method

The method for sealing the twist ball layer used in this step is not particularly limited as long as it is a sealing method capable of sealing the twist ball layer with the above-mentioned first base material and supporting base material. The twist ball layer sealing method may be for example, a method of sealing the twist ball layer by disposing a sealing agent for sealing between the first base material used for the transparent electrode side base material and the supporting base material, or a method of sealing the twist ball layer by using a material enabling lamination process for the first base material used for the transparent electrode side base material and the supporting base material, and executing the lamination process of the first base material and the supporting base material. In the present embodiment, a method of sealing the twist ball layer by the lamination process is more preferable. Since the reason why the method of the lamination process is preferable is same as that explained in "1. Manufacturing method for an electronic paper of a first embodiment", it is not mentioned here.

Moreover, since the method of disposing the transparent electrode side base material in this step is same as that explained in "1. Manufacturing method for an electronic paper of a first embodiment", it is not mentioned here.

(3) Counter Electrode Side Base Material Disposing Step

This step is a step of disposing the above-mentioned counter electrode side base material on the outer side of the supporting base material of the above-mentioned twist ball member in such a way that the above-mentioned counter electrode is on the opposite side with respect to the twist ball member.

In this step, the arrangement method is not particularly limited as long as the counter electrode side base material is disposed on the outer side of the supporting base material of the twist ball member and the counter electrode is on the opposite side with respect to the twist ball member so that the counter electrode side base material and supporting base material may be disposed by a method of completely fixing via an adhesive, and the like, or the counter electrode side base material and the supporting base material may be disposed by an easily detachable method. In this step, it is preferable that the counter electrode side base material and the supporting base material are disposed by an easily detachable method. As examples of the method of disposing the counter electrode side base material, specifically, a disposing method of providing a fixing part for fixing the counter electrode side base material on the supporting base material for fixing the counter electrode side base material onto the fixing part, and a disposing method of installing the counter electrode side base material and the supporting base material via a re-detachable adhesive can be presented.

In this step, in particular, a method of installing the counter electrode side base material and the supporting base material via a re-detachable adhesive is preferable. Since the electronic paper to be manufactured by the manufacturing method of the present embodiment enables reuse of the electronic paper by replacing the counter electrode side base material and the counter electrode side base material and the supporting base material are disposed via a re-detachable adhesive, the counter electrode side base material can easily be replaced.

Here, "re-detachable" denotes that the supporting base material and the second base material can be removed without breakage in the case of detaching the supporting base material and the second base material after adhesion. As such an adhesive, acrylic-based bonding agent or adhesive, silicone-based bonding agent or adhesive, natural rubber-based bonding agent or adhesive, ethylene-vinyl acetate (EVA)-based bonding agent or adhesive, and urethane-based bonding agent or adhesive can be presented. Moreover, it is preferable that the re-detachable adhesive is applied on the counter electrode side base material. Since the re-detachable adhesive does not remain on the supporting base material surface, reuse of the above-mentioned twist ball member can be facilitated.

In this embodiment, the clearance between the supporting base material and the counter electrode side base material at the time of disposing the counter electrode side base material on the supporting base material is not particularly limited as long as a clearance enabling a desired image display by rotating the twist ball is provided when an image display is carried out using the electronic paper to be manufactured by the manufacturing method of the present embodiment. The clearance is preferably 50 µm or less, more preferably 30 µm or less, and particularly preferably 20 µm or less. In the case it is more than the above-mentioned range, supply of the voltage applied to the transparent electrode and the counter electrode for obtaining an electric field E necessary for rotating the twist ball is substantially difficult.

(4) Other Steps

The manufacturing method for an electronic paper of the present embodiment is not particularly limited as long as it has the above-mentioned transparent electrode side base material preparing step, counter electrode side base material preparing step, twist ball layer forming step, twist ball member forming step, and counter electrode side base material disposing step, and as needed steps, may be added appropriately.

3. Manufacturing Method for an Electronic Paper of a Third Embodiment

The manufacturing method for an electronic paper of the present embodiment comprises steps of: a transparent electrode side base material preparing step of preparing a transparent electrode side base material by forming a transparent electrode on one side surface of a first base material including a film having transparency; a counter electrode side base material preparing step of preparing a counter electrode side base material by forming in a pattern a counter electrode using a forming method capable of patterning the counter electrode on one side surface of a second base material comprising a film with an insulation property; a twist ball layer forming step of forming a twist ball layer out of a twist ball and a low polarity solvent layer including a low polarity solvent; a twist ball member forming step of forming a twist ball member by sealing the above-mentioned twist ball layer with a film-like first supporting base material having transparency and with an insulation property and a film-like second supporting base material with an insulation property; a transparent electrode side base material disposing step of disposing the above-mentioned transparent electrode side base material on an outer side of the first supporting base material of the above-mentioned twist ball member; and a counter electrode side base material disposing step of disposing the above-mentioned counter electrode side base material on the outer side of the second supporting base material of the above-mentioned twist ball member in such a way that the above-mentioned counter electrode is on an opposite side with respect to the above-mentioned twist ball member.

The manufacturing method for an electronic paper of the present embodiment will be explained with reference to the drawings. FIGS. 5A to 5E are a process diagram showing an example of a manufacturing method of an electronic paper of the present embodiment. As shown in FIGS. 5A to 5E, the manufacturing method for an electronic paper of the present embodiment is a method for manufacturing an electronic paper 10 by comprising: a transparent electrode side base material preparing step (FIG. 5A) of preparing a transparent electrode side base material 1 by forming a transparent electrode 12 on one side surface of a first base material 11 comprising a film having transparency; a counter electrode side base material preparing step (FIG. 5B) of preparing a counter electrode side base material 2 by forming a counter electrode 22 using a forming method capable of patterning a counter electrode 22 on one side surface of a second base material 21 comprising a film with an insulation property; a twist ball layer forming step (FIG. 5C) of forming a twist ball layer 3 out of a twist ball 3a and a low polarity solvent layer 3b including a low polarity solvent; a twist ball member forming step (FIG. 5D) of forming a twist ball member 30 by sealing the twist ball layer 3 with a film-like first supporting base material having transparency and with an insulation property 201 and a film-like second supporting base material with an insulation property 202; a transparent electrode side base material disposing step (FIG. 5E) of disposing the transparent electrode side base material 1 on the outer side of the first supporting base material 201 of the above-mentioned twist ball member 30; and a counter electrode side base material disposing step (FIG. 5E) of disposing the counter electrode side base material 2 on the outer side of the second supporting base material 202 of the twist ball member 30 in such a way that the counter electrode 22 is on the opposite side with respect to the twist ball member 30.

Figure 5A:
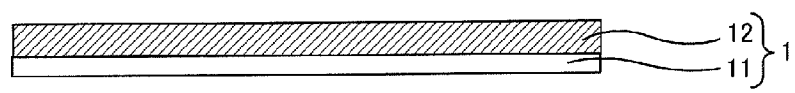
FIGS. 5A to 5E are a process diagram showing another example of a manufacturing method of a twist ball type electronic paper of the present invention.
Figure 5B:
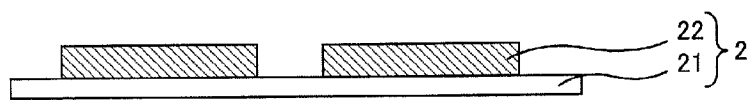
Figure 5C:
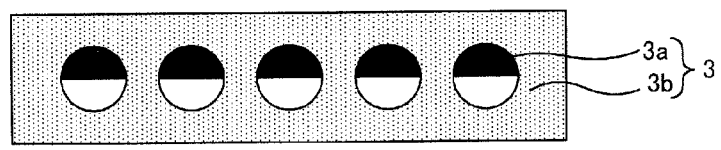
Figure 5D:
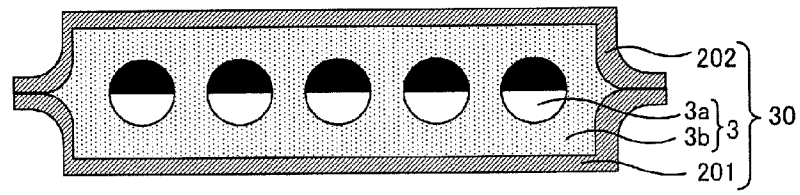
Figure 5E:
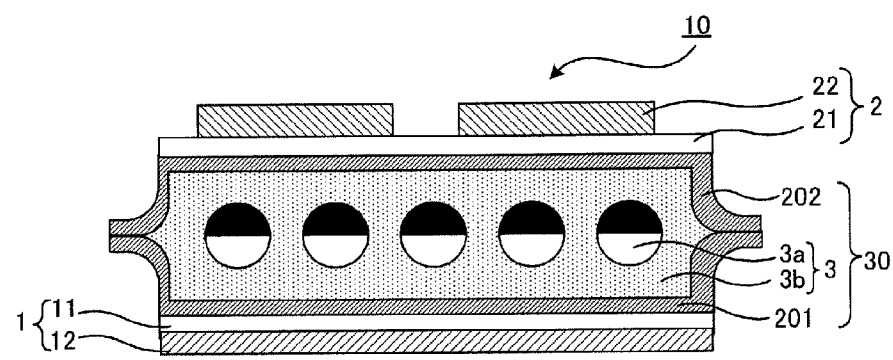

Moreover, FIGS. 5A to 5E shows an example of sealing the twist ball layer 3 by the lamination process of the first supporting base material 201 and the second supporting base material 202 in the twist ball member forming step (FIG. 5D). Although it is not shown in the drawings, in the twist ball member forming step, the twist ball layer may be sealed by disposing a sealing agent between the first supporting base material and the second supporting base material.

Also in the present embodiment, an electronic paper capable of comprising the above-mentioned twist ball member and the above-mentioned counter electrode side base material provided independently can be manufactured, and furthermore, an electronic paper without direct contact of the counter electrode with the twist ball layer can be manufactured. Therefore, an electronic paper capable of providing the same effects as an electronic paper manufactured by the above-described manufacturing method for an electronic paper of the second embodiment can be manufactured. Since the above-mentioned effects are explained in detail in "2. Manufacturing method for an electronic paper of a second embodiment", explanation is omitted here.

Furthermore, according to the present embodiment, an electronic paper can be manufactured easily by attaching the members after independently forming the above-mentioned transparent electrode side base material, twist ball member and counter electrode side base material.

Hereafter, each step in the manufacturing method for an electronic paper of the present embodiment will be explained. Since the transparent electrode side base material preparing step, the counter electrode side base material preparing step, the twist ball layer forming step and the counter electrode side base material disposing step in the present embodiment are same as the steps explained in "2. Manufacturing method for an electronic paper of a second embodiment", it is not mentioned here.

(1) Twist Ball Member Forming Step

This step is a step of forming a twist ball member by sealing the twist ball layer with a film-like first supporting base material having transparency and with an insulation property and a film-like second supporting base material with an insulation property. Hereafter, the sealing method for the first supporting base material, the second supporting base material and the twist ball layer will be explained.

(a) First Supporting Base Material and Second Supporting Base Material

Since the second supporting base material used in the present step is same as that explained in the supporting base material of "2. Manufacturing method for an electronic paper of a second embodiment", it is not mentioned here.

The first supporting base material used in this step is not particularly limited as long as it is a base material having transparency and with an insulation property capable of sealing the above-mentioned twist ball layer together with the second supporting base material for providing the twist ball member, and the above-mentioned transparent electrode side base material is disposed on the surface on the opposite side with respect to the twist ball layer of the first supporting base material. The material for such a first supporting base material specifically can be same as those mentioned in "1. Manufacturing method for an electronic paper of a first embodiment", explanation is omitted here.

Since the first supporting base material may be same as that explained in "2. Manufacturing method for an electronic paper of a second embodiment" a in terms of the points other than those mentioned above, it is not mentioned here.

In this step, as the above-mentioned first supporting base material and the above-mentioned second supporting base material, those made of a material enabling the lamination process are used preferably. In this step, as it will be described later, it is preferable to seal the twist ball layer by the lamination process of the first supporting base material and the second supporting base material. Moreover, in the case the first supporting base material and the second supporting base material are made of a material enabling the lamination process, it is preferable that the materials of the first supporting base material and the second supporting base material are same. Since the materials of the first supporting base material and the second supporting base material are same, the adhesion at the time of the lamination process of the first supporting base material and the second supporting base material can be made higher.

(b) Twist Ball Layer Sealing Method

Since the method same as the method of sealing the twist ball layer using the first base material and the supporting base material explained in "2. Manufacturing method for an electronic paper of a second embodiment" described above can be used as the method for sealing the twist ball layer used in this step, explanation is omitted here.

(2) Transparent Electrode Side Base Material Disposing Step

This step is a step of disposing the above-mentioned transparent electrode side base material on the outer side of the first supporting base material of the above-mentioned twist ball member.

Since the transparent electrode side base material disposing step can be same as that explained in "1. Manufacturing method for an electronic paper of a first embodiment", it is not mentioned here.

Moreover, since the other points are same as those explained for the counter electrode side base material disposing step in "2. Manufacturing method for an electronic paper of a second embodiment" in terms of the points other than those mentioned above, it is not mentioned here.

B. Manufacturing Method for a Reproduced Twist Ball Type Electronic Paper

Next, the manufacturing method for a reproduced twist ball type electronic paper (hereafter, it may be referred to simply as a reproduced electronic paper) of the present invention will be explained.

The manufacturing method for a reproduced electronic paper of the present invention comprises steps of: preparing a twist ball type electronic paper before replacement comprising: a twist ball member further comprising: a transparent electrode side base material having a first base material made of a film having transparency and a transparent electrode formed on one side surface of the first base material; a film-like supporting base material with an insulation property; a twist ball layer having a twist ball and a low polarity solvent layer including a low polarity solvent, so that the twist ball layer is sealed with the first base material and the supporting base material; and a counter electrode side base material before replacement further comprising a second base material made of a film with an insulation property; and a counter electrode formed on one side surface of the second base material, so that the counter electrode side base material before replacement is disposed on an outer side of the supporting base material of the twist ball member in such a way that the counter electrode is on an opposite side with respect to the twist ball member; detaching the counter electrode side base material before replacement from the twist ball member; and disposing and mounting another new counter electrode side base material on the outer side of the supporting base material of the twist ball member after detachment of the counter electrode side base material before replacement in such a way that the counter electrode of the new counter electrode side base material is on the opposite side with respect to the twist ball member.

Figure 6A:
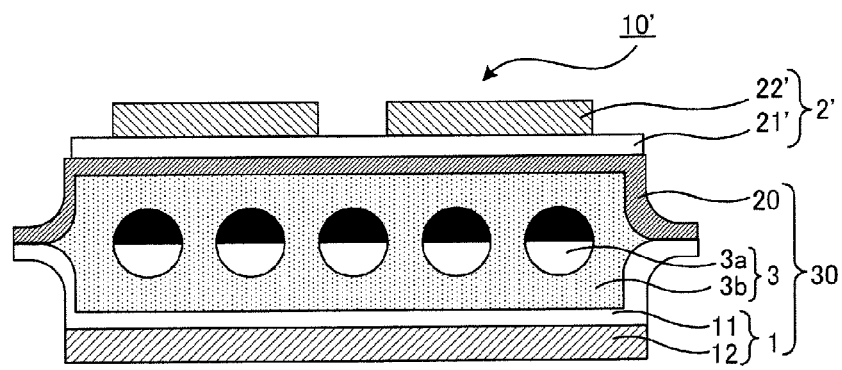
FIGS. 6A to 6C are a process diagram showing an example of a manufacturing method for a reproduced twist ball type electronic paper of the present invention.
Figure 6B:
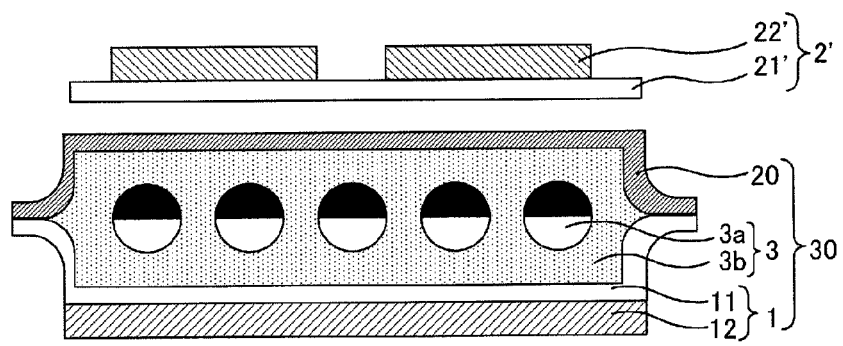
Figure 6C:
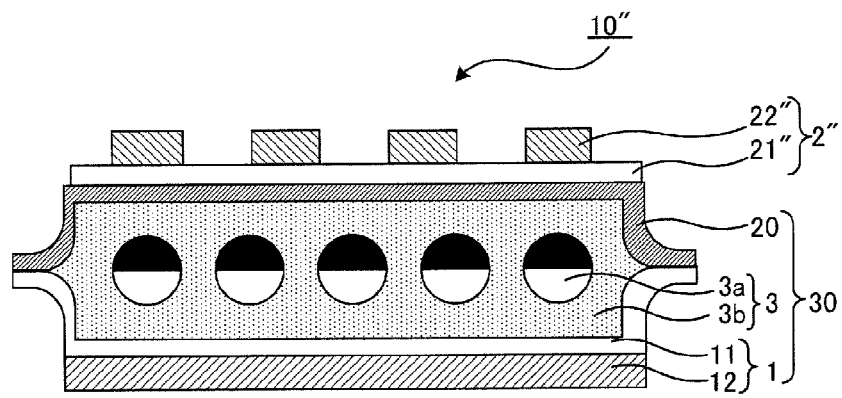

The manufacturing method for a reproduced electronic paper of the present invention will be explained with reference to the drawings. FIGS. 6A to 6C are a process diagram showing an example of a manufacturing method of a reproduced electronic paper of the present invention. According to the manufacturing method for a reproduced electronic paper of the present invention, first, an electronic paper before replacement 10' comprising: a twist ball member 30 which further comprises a transparent electrode side base material 1 having a first base material 11 made of a film having transparency and a transparent electrode 12 formed on one side surface of the first base material 11, a film-like supporting base material 20 with an insulation property, a twist ball layer 3 having a twist ball 3a and a low polarity solvent layer 3b including a low polarity solvent, so that the twist ball layer 3 is sealed with the first base material 11 and the supporting base material 20; and a counter electrode side base material before replacement 2' which further comprises a second base material 21' having a film with an insulation property, and a counter electrode 22' formed on one side surface of the second base material, so that the counter electrode side base material before replacement 2' is disposed on the outer side of the supporting base material 20 of the twist ball member 30 in such a way that the a counter electrode 22 is on the opposite side with respect to the twist ball member 30 is prepared (FIG. 6A). Then, by detaching the counter electrode side base material before replacement 2' from the twist ball member 30 of the electronic paper before replacement 10' (FIG. 6B), and disposing and mounting another new counter electrode side base material 2" on the outer side of the supporting base material 20 of the twist ball member 30 after detachment of the counter electrode side base material before replacement 2' in such a way that the counter electrode 22" of the new counter electrode side base material 2" is on the opposite side with respect to the twist ball member 30, a reproduced electronic paper 10" is produced (FIG. 6C). The new counter electrode side base material 2" comprises a second base material 21" and a counter electrode 22".

According to the present invention, only by detaching the counter electrode side base material before replacement from the twist ball member of the electronic paper before replacement, and mounting another new counter electrode side base material on the twist ball member after detachment of the counter electrode side base material before replacement, a reproduced electronic paper capable of carrying out a different image display can be obtained with the display quality equivalent to that of the electronic paper before replacement. Moreover, since the twist ball member of the electronic paper before replacement can be used repeatedly, the production cost can be reduced dramatically.

Moreover, as described above, since the image display by the reproduced electronic paper can be changed only by replacing the counter electrode side base material before replacement, it can be used preferably at the time of manufacturing an electronic paper used for an information medium, for which frequent renewal of the information is required. By replacing the counter electrode side base material before replacement as mentioned above, various image displays can be enabled so that an electronic paper can be provided on demand at a low cost.

Moreover, according to the present invention, since the new counter electrode side base material is disposed and mounted on the outer side of the supporting base material of the twist ball member and in such a way that the counter electrode of the new counter electrode side base material is the opposite side with respect to the twist ball member, a reproduced electronic paper capable of easily taking out the wiring from the counter electrode can be produced.

Hereafter, the electronic paper before replacement, and the new counter electrode side base material used for the manufacturing method for a reproduced electronic paper of the present invention will be explained, respectively.

(a) Electronic Paper Before Replacement

The electronic paper before replacement used in the present invention comprises: a twist ball member which further comprises: a transparent electrode side base material having a first base material made of a film having transparency and a transparent electrode formed on one side surface of the first base material, a film-like supporting base material, a twist ball layer having a twist ball and a low polarity solvent layer including a low polarity solvent, so that the twist ball layer is sealed with the first base material and the supporting base material; and a counter electrode side base material before replacement which further comprises a second base material with an insulation property, and a counter electrode formed on one side surface of the second base material, so that the counter electrode side base material before replacement is disposed on the outer side of the supporting base material of the twist ball member in such a way that the counter electrode is on the opposite side with respect to the twist ball member.

The electronic paper before replacement used in the present invention is manufactured by the manufacturing method mentioned in "2. Manufacturing method for an electronic paper of a second embodiment" or "3. Manufacturing method for an electronic paper of a third embodiment" described above. In the case the above-mentioned electronic paper before replacement is manufactured by the manufacturing method for an electronic paper of the third embodiment, the laminate of the first supporting base material and the transparent electrode side base material is used as the above-mentioned transparent electrode side base material, and the second supporting base material as the above-mentioned supporting base material.

Since the counter electrode side base material and the twist ball member used for the above-mentioned electronic paper before replacement may be same as those mentioned in "2. Manufacturing method for an electronic paper of a second embodiment", it is not mentioned here.

Moreover, in the electronic paper before replacement, it is preferable that the counter electrode side base material and the twist ball member are disposed via a re-detachable adhesive. Thereby, the counter electrode side base material can easily be detached from the twist ball member. Since the re-detachable adhesive may be same as those mentioned in "2. Manufacturing method for an electronic paper of a second embodiment", it is not mentioned here.

(b) New Counter Electrode Side Base Material

The new counter electrode side base material used in the present invention is prepared independently of the counter electrode side base material of the electronic paper before replacement, and it comprises a second base material made of an insulation film, and a counter electrode formed in a pattern on the second base material.

Moreover, the new counter electrode side base material is mounted on the outer side of the twist ball member with the counter electrode side base material detached in the electronic paper before replacement in such a way that the counter electrode is disposed on the opposite side with respect to the twist ball member.

The new counter electrode side base material is not particularly limited as long as it can execute the image display of the reproduced electronic paper to be manufactured in the present invention with the display quality equivalent to the image display of the electronic paper before replacement by attaching to the above-described twist ball member. It is preferable that is has a counter electrode of a pattern shape different from that of the counter electrode of the counter electrode side base material in the electronic paper before replacement. Thereby, different image displays are enabled in the electronic paper before replacement and the reproduced electronic paper.

Since the material of the new counter electrode side base material, the film thickness, and the method for forming the counter electrode used in the present invention may be same as those explained in "2. Manufacturing method for an electronic paper of a second embodiment", explanation is omitted here.

In the present invention, as the method for forming the counter electrode used for the new counter electrode side base material, in particular, a method of forming the counter electrode using a cutting machine, or a method of forming the counter electrode by an ink jet process is preferable.

Since the method for disposing the new counter electrode side base material used in the present invention may be same as that explained in "2. Manufacturing method for an electronic paper of a second embodiment", explanation is omitted here. Moreover, in the present invention, it is preferable that the new counter electrode side base material is disposed on the surface on the opposite side with respect to the twist ball member of the supporting base material of the twist ball member via a re-detachable adhesive because the reproduced electronic paper manufactured by the present invention can also be reused easily.

(c) Others

The manufacturing method for a reproduced electronic paper of the present invention is used preferably for production of an electronic paper for a segment as an information medium for a small quantity and a wide variety. Since the electronic paper for a segment as the information medium of a small quantity and a wide variety has a short carrying period of the information to be displayed, frequent image display change is required. Therefore, by use of the manufacturing method for a reproduced electronic paper of the present invention, an electronic paper as an information medium of a small quantity and a wide variety can be obtained efficiently at a low cost.

The present invention is not limited to the above-mentioned embodiments. The above-mentioned embodiments are only examples, and any one having a configuration substantially same as the technological idea mentioned in the scope of the claims of the present invention for achieving the same effects are incorporated in the technological scope of the present invention.

EXAMPLES

Example 1

A twist ball of about a 100 µm particle size having a black phase charged positively and a white phase charged negatively was prepared. A sheet of a 300 μm thickness with the twist ball dispersed was produced by dispersing the same in a thermosetting silicone resin, applying the same onto a glass substrate with a coater, and applying a heat treatment. Then, the twist ball dispersed sheet was impregnated with a silicone oil for 24 hours so as to be swelled (twist ball layer).

Then, a laminate film with an ITO formed on a PET surface (CPP/PET) was prepared (common electrode side base material). Then, an ink with a silver nano particle (about 50 μm diameter) dispersed in a solvent was prepared for patterning the PET surface of the laminate film (CPP/PET) by an ink jet process according to a display design (display electrode side base material).

Then, an electronic paper for a segment was obtained by interposing the twist ball layer between the common electrode side base material with the ITO surface disposed on the outer side and the display electrode side base material with the silver surface disposed on the outer side for applying lamination process for sealing the twist ball layer. Thereafter, wiring was formed using a conductive tape and a lead line according to the display design for applying an optional voltage signal of ±80 V to the display electrode via the lead line for displaying the design on the electronic paper for a segment.

Example 2

An insulation layer was formed on the display electrode side base material of the Example 1 by patterning with an UV setting resin by an inkjet process. Then, an ink with a silver nano particle (about 50 μm diameter) dispersed in a solvent was prepared for wiring for the display electrode by an ink jet process. Using the same, in the same manner as in the Example 1, the twist ball layer was sealed by the lamination process for obtaining an electronic paper for a segment. Moreover, display was carried out in the same manner as in the Example 1.

Example 3

An electronic paper for a segment was manufactured for display in the same manner as in the Example 1 except that the display electrode side base material in the Example 1 was changed for the ink jet process so as to be formed as follows.

First, an aluminum deposition PET film with a detachable sheet was prepared so as to be cut according to a display design with a cutting machine. Then, after removing the unnecessary portions, the aluminum deposition PET film cut in a pattern was taken onto a transfer sheet for transferring onto the PET surface of a laminate film (CPP/PET).

Example 4

A twist ball of about a 100 μm particle size having a blue colored phase charged positively and a white phase charged negatively was prepared. A sheet of a 300 μm thickness with the twist ball dispersed was produced by dispersing the same in a thermosetting silicone resin, applying the same onto a glass substrate with a coater, and applying a heat treatment. Then, the twist ball dispersed sheet was impregnated with a silicone oil for 24 hours so as to be swelled (twist ball layer).

Then, two laminate films (CPP/PET) were prepared for obtaining a twist ball member by interposing the twist ball layer with the PET surfaces disposed on the outer side so as to be laminated.

Then, a PET film with an ITO formed was prepared (common electrode side base material). Then, an ink with a silver nano particle (about 50 μm diameter) dispersed in a solvent was prepared for using the same for preparing a PET film by patterning the PET film according to the display design by an ink jet process (display electrode side base material). Then, by applying a bonding agent on the PET film side of the display electrode side base material and the common electrode side base material and attaching the same onto both sides of the twist ball member, an electronic paper for a segment was obtained. Thereafter, wiring was applied using a conductive tape and a lead line according to the display design. Moreover, display was carried out in the same manner as in the Example 1.

Example 5

Using a silicon based re-detachable adhesive for the bonding agent to be applied onto the PET film side of the display electrode side base material of the Example 4, the PET film side of the display electrode side base material and the common electrode side base material were attached onto the twist ball member as shown in the Example 4. Thereafter, wiring was applied using a conductive tape and a lead line according to the display design (electronic paper before replacement). Moreover, using the electronic paper before replacement, display was carried out in the same manner as in the Example 1.

Then, a new electrode pattern for display of a new design was prepared on a new PET film in the same manner as in the Example 4 by an ink jet process (new display electrode side base material). Then, a silicon based re-detachable adhesive was applied on the PET film side of the new display electrode side base material.

Then, the display electrode side base material attached onto the twist ball member using the re-detachable adhesive was detached so that the new display electrode side base material was attached onto the twist ball member with the display electrode side base material detached.

Thereafter, wiring was formed using a conductive tape and a lead line according to the display design for applying an optional voltage signal of ±80 V to the display electrode via the lead line for displaying the design on the electronic paper.

In each of the Examples 1 to 4, preferable image display was carried out. Moreover, in the Example 5, also in the case of display using the display electrode side base material before replacement, and also in the case of display using the new display electrode side base material, preferable image display was carried out.

REFERENCE SIGNS LIST 1 transparent electrode side base material
11 first base material
12 transparent electrode
2 counter electrode side base material
21 second base material
22 counter electrode
3 twist ball layer
3a twist ball
3b low polarity solvent layer
10 electronic paper
10' electronic paper before replacement
10" reproduced electronic paper
20 supporting base material
201 first supporting base material
202 second supporting base material
30 twist ball member

The invention claimed is:

1. A manufacturing method for a reproduced twist ball type electronic paper comprising the steps of:
preparing a twist ball type electronic paper before replacement comprising:
a twist ball member further comprising: a transparent electrode side base material having a first base material made of a film having transparency and a transparent electrode formed on one side surface of the first base material, a film-like supporting base material with an insulation property, and a twist ball layer having a twist ball and a low polarity solvent layer including a low polarity solvent, so that the twist ball layer is sealed with the first base material and the supporting base material; and
a counter electrode side base material before replacement further comprising a second base material made of a film with an insulation property, and a counter electrode formed on one side surface of the second base material, so that the counter electrode side base material before replacement is disposed via a re-detachable adhesive on an outer side of the supporting base material of the twist ball member in such a way that the counter electrode is on an opposite side with respect to the twist ball member;
detaching the counter electrode side base material before replacement from the twist ball member; and
disposing and mounting via a re-detachable adhesive another new counter electrode side base material comprising a counter electrode of a pattern shape different from that of the counter electrode of the counter electrode side base material before replacement on the outer side of the supporting base material of the twist ball member after detachment of the counter electrode side base material before replacement in such a way that the counter electrode of the new counter electrode side base material is on the opposite side with respect to the twist ball member.

2. The manufacturing method for a twist ball type electronic paper according to claim 1, wherein the counter electrode is formed by a pattern application method.

3. The manufacturing method for a twist ball type electronic paper according to claim 2, wherein the pattern application method is an ink jet process.

* * * * *